United States Patent
Kashibuchi

(10) Patent No.: US 10,222,971 B2
(45) Date of Patent: Mar. 5, 2019

(54) DISPLAY APPARATUS, METHOD, AND STORAGE MEDIUM

(71) Applicant: CANON KABUSHIKI KAISHA, Tokyo (JP)

(72) Inventor: Yoichi Kashibuchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 432 days.

(21) Appl. No.: 14/558,475

(22) Filed: Dec. 2, 2014

(65) Prior Publication Data

US 2015/0153927 A1    Jun. 4, 2015

(30) Foreign Application Priority Data

Dec. 4, 2013  (JP) ................................. 2013-251394

(51) Int. Cl.
| | | |
|---|---|---|
| *G06F 3/0488* | (2013.01) | |
| *G06F 9/451* | (2018.01) | |
| *G06T 3/40* | (2006.01) | |
| *G06F 3/0483* | (2013.01) | |
| *G06F 3/0485* | (2013.01) | |
| *G06T 11/60* | (2006.01) | |
| *G06F 3/041* | (2006.01) | |

(52) U.S. Cl.
CPC ............ *G06F 3/0488* (2013.01); *G06F 3/041* (2013.01); *G06F 3/0483* (2013.01); *G06F 3/0485* (2013.01); *G06F 9/451* (2018.02); *G06F 2203/04806* (2013.01); *G06T 3/40* (2013.01); *G06T 11/60* (2013.01)

(58) Field of Classification Search
CPC .... G06F 3/0488; G06F 3/0485; G06F 3/0483; G06F 3/041; G06F 2203/04806; G06F 9/4443; G06T 3/40; G06T 11/60
See application file for complete search history.

(56) References Cited

U.S. PATENT DOCUMENTS

| | | | | |
|---|---|---|---|---|
| 8,291,350 | B1* | 10/2012 | Park ................... | G06F 3/04883 715/705 |
| 2010/0157107 | A1* | 6/2010 | Iijima .................. | H04N 5/232 348/240.99 |
| 2013/0263055 | A1* | 10/2013 | Victor ................. | G06F 3/0485 715/835 |
| 2014/0152589 | A1* | 6/2014 | Komoda ............. | G06F 3/04883 345/173 |
| 2014/0160168 | A1* | 6/2014 | Ogle .................... | G09G 5/34 345/660 |

FOREIGN PATENT DOCUMENTS

| | | |
|---|---|---|
| JP | 2002-149152 A | 5/2002 |
| JP | 2007-166616 A | 6/2007 |
| JP | 2013-114612 A | 6/2013 |
| JP | 2013-168799 A | 8/2013 |
| WO | 2013/171934 A1 | 11/2013 |

* cited by examiner

*Primary Examiner* — William Boddie
*Assistant Examiner* — Saifeldin E Elnafia
(74) *Attorney, Agent, or Firm* — Canon USA, Inc., IP Division

(57) ABSTRACT

In a case where it is determined that a swipe operation having a swipe amount equal to or greater than a predetermined amount is performed by a user when one of a plurality of objects included in a page is displayed as a main object on a screen, one of other objects to be displayed when the swipe operation is performed is estimated as a next main object and displayed on the screen based on the swipe operation.

7 Claims, 36 Drawing Sheets

FIG.8

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | PRESENCE |
| BLOCK 2 | 3 | X2 | Y2 | W2 | H2 | PRESENCE |
| BLOCK 3 | 2 | X3 | Y3 | W3 | H3 | ABSENCE |
| BLOCK 4 | 1 | X4 | Y4 | W4 | H4 | PRESENCE |
| BLOCK 5 | 3 | X5 | Y5 | W5 | H5 | PRESENCE |
| BLOCK 6 | 2 | X6 | Y6 | W6 | H6 | ABSENCE |

*ATTRIBUTE 1: CHARACTER, 2: PHOTO, 3: GRAPHIC

INPUT FILE INFORMATION

| TOTAL NUMBER OF BLOCKS | N (= 6) |
|---|---|

FIG. 18

```xml
<?xml version="1.0" encoding="UTF-8"?>
<svg:svg xmlns:svg="http://www.w3.org/2000/svg" xmlns:xlink="http://www.w3.org/1999/xlink"
xmlns:rcd="http://www.canon.com/ns/rcd" width="640" height="905" viewBox="0 0 4960 7015">

<svg:svg rcd:gType ="background"  x="0" y="0" width="4960" height="7015">            ~1801
        <svg:image x="0" y="0" width="1240" height="1753" xlink:href="p001_bg.jpg" transform="matrix(4.0 0 0 4.0 0 0)" />
    </svg:svg>

<svg:g >

<svg:svg rcd:gType="text" x="236" y="2228" width="4532" height="340">                ~1802
        <svg:image x="0" y="0" width="4532" height="340" xlink:href="p001_a001.jpg" />
        <svg:text font-size ="51" >                                                       ~1803
            <svg:tspan y="0" x="0 348 696 1044 1392 ... 4176"> TEXT-ABCDEFGHIJKL...</svg:tspan>
        </svg:text>
    </svg:svg>

<svg:svg rcd:gType="picture" x="1548" y="3928" width="2616" height="2940">            ~1804
        <svg:image x="0" y="0" width="1308" height="1470" xlink:href="p001_a002.jpg" transform="matrix(2.0 0 0 2.0 0 0)" />
    </svg:svg>

</svg:g>
</svg:svg>
```

FIG.21A

| EVENT NAME | TOUCH PRESSING EVENT |
|---|---|
| TRANSMISSION INFORMATION | PRESSED COORDINATE VALUE |
| | LATEST NUMBER OF COORDINATES |

FIG.21B

| EVENT NAME | SWIPE EVENT |
|---|---|
| TRANSMISSION INFORMATION | EVENT OCCURRED COORDINATE VALUE |
| | MOVING DISTANCE |

FIG.21C

| EVENT NAME | PINCH-IN EVENT |
|---|---|
| TRANSMISSION INFORMATION | CENTER COORDINATE VALUE OF PINCH-IN |
| | REDUCTION RATIO OF PINCH-IN |

FIG.21D

| EVENT NAME | PINCH-OUT EVENT |
|---|---|
| TRANSMISSION INFORMATION | CENTER COORDINATE VALUE OF PINCH-OUT |
| | ENLARGEMENT RATIO OF PINCH-OUT |

FIG.21E

| EVENT NAME | TWO POINT SWIPE EVENT |
|---|---|
| TRANSMISSION INFORMATION | EVENT OCCURRED COORDINATE VALUE |
| | MOVING DISTANCE |

FIG.21F

| EVENT NAME | ROTATION EVENT |
|---|---|
| TRANSMISSION INFORMATION | CENTER COORDINATE VALUE OF ROTATION |
| | ROTATION ANGLE |

FIG.21G

| EVENT NAME | FLICK EVENT |
|---|---|
| TRANSMISSION INFORMATION | LATEST COORDINATE VALUE |
| | SPEED WHEN TAKING OFF |

FIG.21H

| EVENT NAME | TOUCH RELEASE EVENT |
|---|---|
| TRANSMISSION INFORMATION | RELEASED COORDINATE VALUE |
| | LATEST NUMBER OF COORDINATES |

FIG.21I

| EVENT NAME | DOUBLE-TAP EVENT |
|---|---|
| TRANSMISSION INFORMATION | LATEST COORDINATE VALUE |

FIG.21J

| EVENT NAME | SINGLE-TAP EVENT |
|---|---|
| TRANSMISSION INFORMATION | LATEST COORDINATE VALUE |

FIG.21K

| EVENT NAME | LONG-TAP EVENT |
|---|---|
| TRANSMISSION INFORMATION | LATEST COORDINATE VALUE |

FIG.21L

| EVENT NAME | TOUCH AND HOLD EVENT |
|---|---|
| TRANSMISSION INFORMATION | LATEST COORDINATE VALUE |

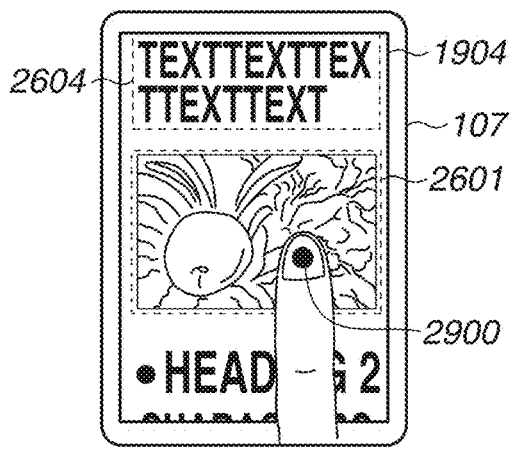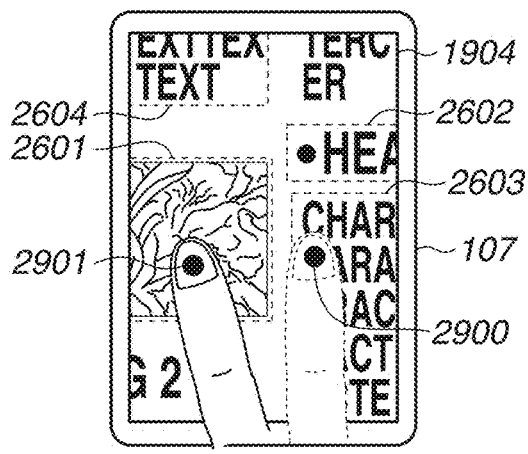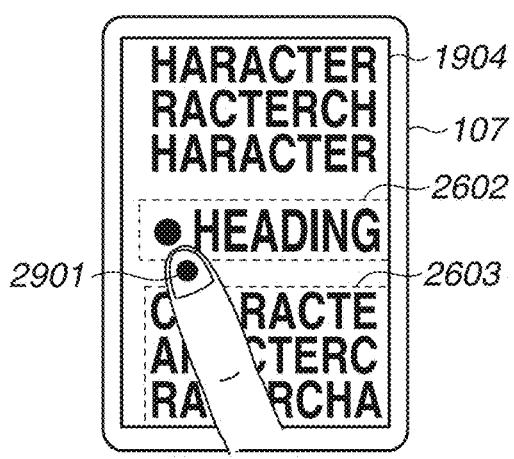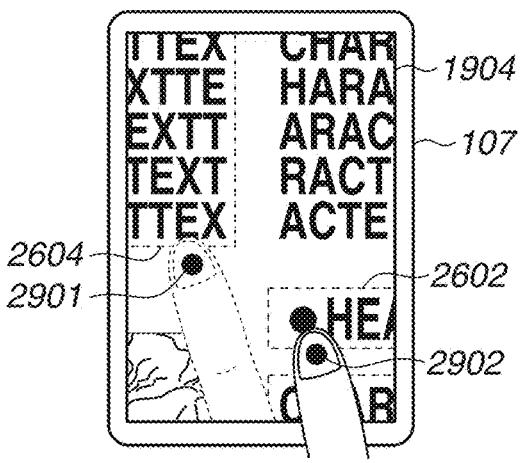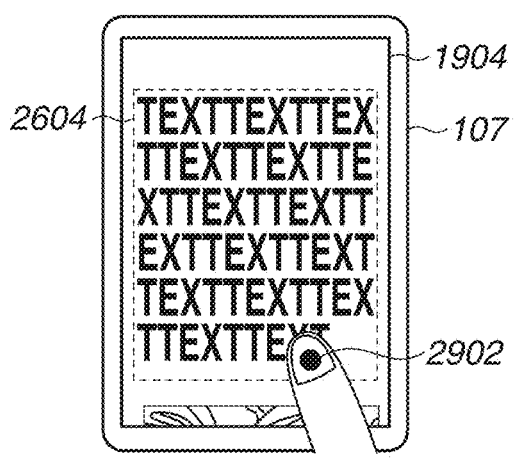

DISPLAY APPARATUS, METHOD, AND STORAGE MEDIUM

BACKGROUND OF THE INVENTION

Field of the Invention

The present disclosure generally relates to display and, more particularly, to a display apparatus, display method, and storage medium for browsing structured page data.

Description of the Related Art

Conventionally, a relatively small display apparatus, such as a smartphone and a tablet, enlarges a part of a character image when displaying the character image. Japanese Patent Application Laid-Open No. 2013-114612 discusses a technique for displaying a structured document which is structured from a plurality of components using a page display area for displaying an entire page and an enlargement display area for displaying a part of the component with enlargement. In addition, Japanese Patent Application Laid-Open No. 2013-114612 discusses that the part of the component displayed in the enlarged display area is browsed by scrolling with a flick operation. In Japanese Patent Application Laid-Open No. 2013-114612, when a user taps a desired portion in the page display area, a component in the tapped position is displayed in the enlarged display area. Further, when a user makes a flick operation in the enlarged display area and a component currently enlarged has reached an edge, previous or next component is displayed in the enlarged display area in a predetermined order. Accordingly, when a user makes a clear instruction operation with respect to a sentence displayed on a screen, a component at an instructed position or a component in a predetermined order can be displayed with enlargement.

According to Japanese Patent Application Laid-Open No. 2007-166616, one page of a document is divided into nine areas of three by three, and when a user selects one area of them by an instruction operation, the selected area is displayed on a screen with enlargement. Further, Japanese Patent Application Laid-Open No. 2007-166616 discusses a technique in which if a user presses one of upward, downward, right, and left direction keys in a state that one area is displayed on the screen with enlargement, another divided area which is in one-to-one correspondence with those keys is displayed with enlargement.

However, according to the method discussed in Japanese Patent Application Laid-Open No. 2013-114612, an area displayed when a flick operation is made on the enlarged display screen is limited to a next area (or a previous area) in the predetermined order. In other words, an order of enlarged display is determined in advance in the method discussed in Japanese Patent Application Laid-Open No. 2013-114612, so that the areas cannot be displayed in an order that a user wants.

In addition, according to Japanese Patent Application Laid-Open No. 2007-166616, an area associated with the pressed direction key in the upward, downward, right, and left direction keys is displayed, however, it is necessary to divide a document page into simple shapes, such as three by three areas, and the technique cannot be applied to a document having a complicated layout structure.

SUMMARY OF THE INVENTION

According to an aspect of the present disclosure, a display apparatus includes a determination unit configured to determine whether a swipe operation having a swipe amount equal to or greater than a predetermined amount is performed by a user when one of a plurality of objects included in a page is displayed as a main object on a screen, an estimation unit configured to, in a case where the determination unit determines that a swipe operation having a swipe amount equal to or greater than the predetermined amount is performed, estimate one of other objects to be displayed when the swipe operation is performed as a next main object based on the swipe operation, and a display control unit configured to display the object estimated by the estimation unit as a next main object on the screen.

Further features of the present disclosure will become apparent from the following description of exemplary embodiments with reference to the attached drawings.

BRIEF DESCRIPTION OF THE DRAWINGS

FIG. 8 illustrates block information of each attribute at the time of object division and input file information.

FIG. 18 is an example of a scalable vector graphics (SVG) format described according to the first exemplary embodiment.

FIGS. 21A, 21B, 21C, 21D, 21E, 21F, 21G, 21H, 21I, 21J, 21K, and 21L illustrate a list of gesture event names and information transmitted when each event occurs.

FIGS. 29A, 29B, 29C, 29D, and 29E are examples of screen display of a touch UI on a mobile information terminal.

DESCRIPTION OF THE EMBODIMENTS

Various exemplary embodiments, features, and aspects of the disclosure will be described in detail below with reference to the drawings.

Figure 1:
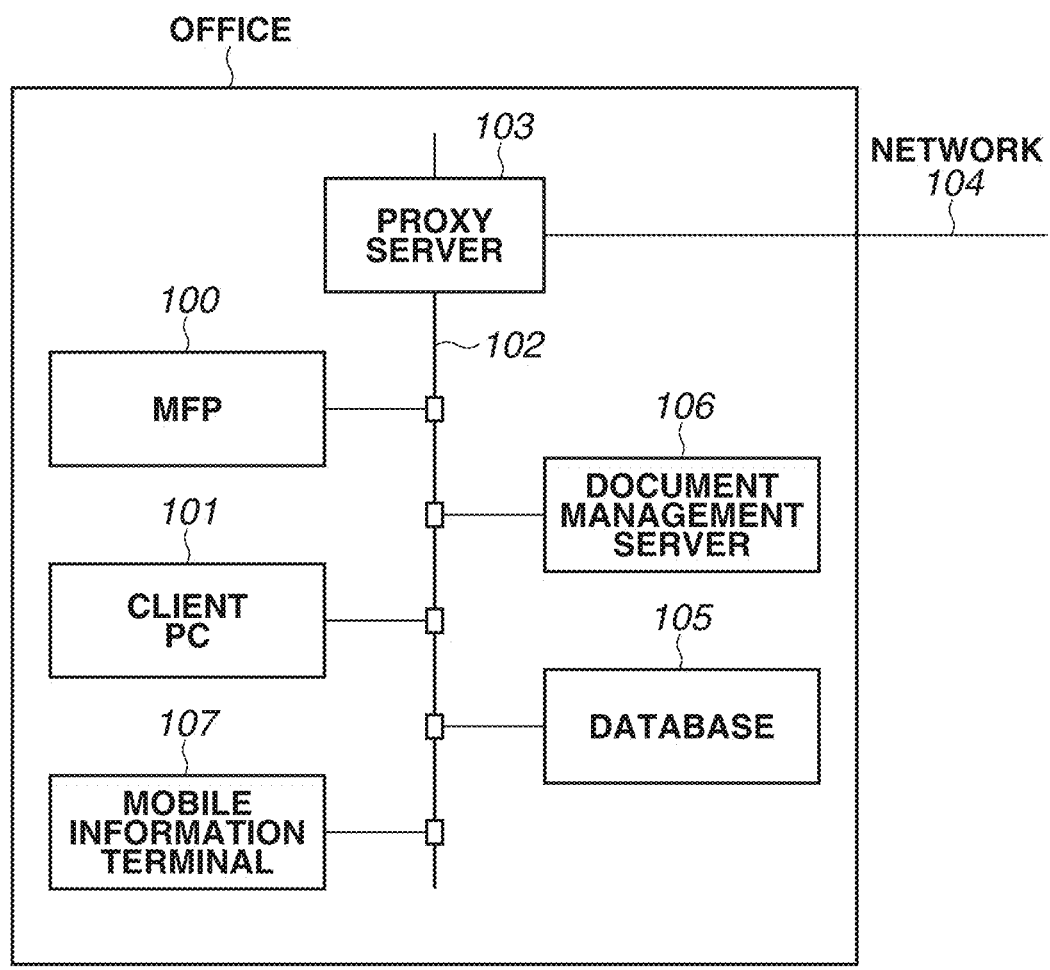
FIG. 1 is a block diagram illustrating an image processing system according to the present disclosure.

FIG. 1 is a block diagram illustrating a configuration of an image processing system according to a first exemplary embodiment. In FIG. 1, a multifunction peripheral (MFP) 100 for realizing a plurality of types of functions (a copy function, a print function, a transmission function, and so on) and a client PC 101 are connected to a local area network (LAN) 102 constructed in an office. Further, a proxy server 103, a document management server 106, a database 105 for the document management server 106, and a mobile information terminal 107 are connected to the LAN 102 wirelessly or by wire. The LAN 102 is connected to a network 104 via the proxy server 103. The client PC 101 transmits, for example, print data to the MFP 100 and thus can print a print product based on the print data by the MFP 100. The configuration illustrated in FIG. 1 is an example and a plurality of offices including similar components can be connected on the network 104.

Various terminals of the client PC 101 and the proxy server 103 respectively include standard components (for example, a central processing unit (CPU), a random access memory (RAM), a read-only memory (ROM), a hard disk, a network interface (I/F), a display, a keyboard, and a mouse) which are installed in a general computer. Further, the network 104 is typically implemented by any one of the Internet, the LAN, a wide area network (WAN), a telephone line, a dedicated digital line, an asynchronous transfer mode (ATM) or a frame relay line, a satellite communication line, a cable television line, and a data broadcast wireless line. It is needless to say that any communication network realized by combinations of the above-mentioned lines can be used as the network 104 as long as data can be transmitted and received. As used herein, the term "unit" generally refers to any combination of software, firmware, hardware or other component, such as circuitry, that is used to effectuate a purpose.

Figure 2:
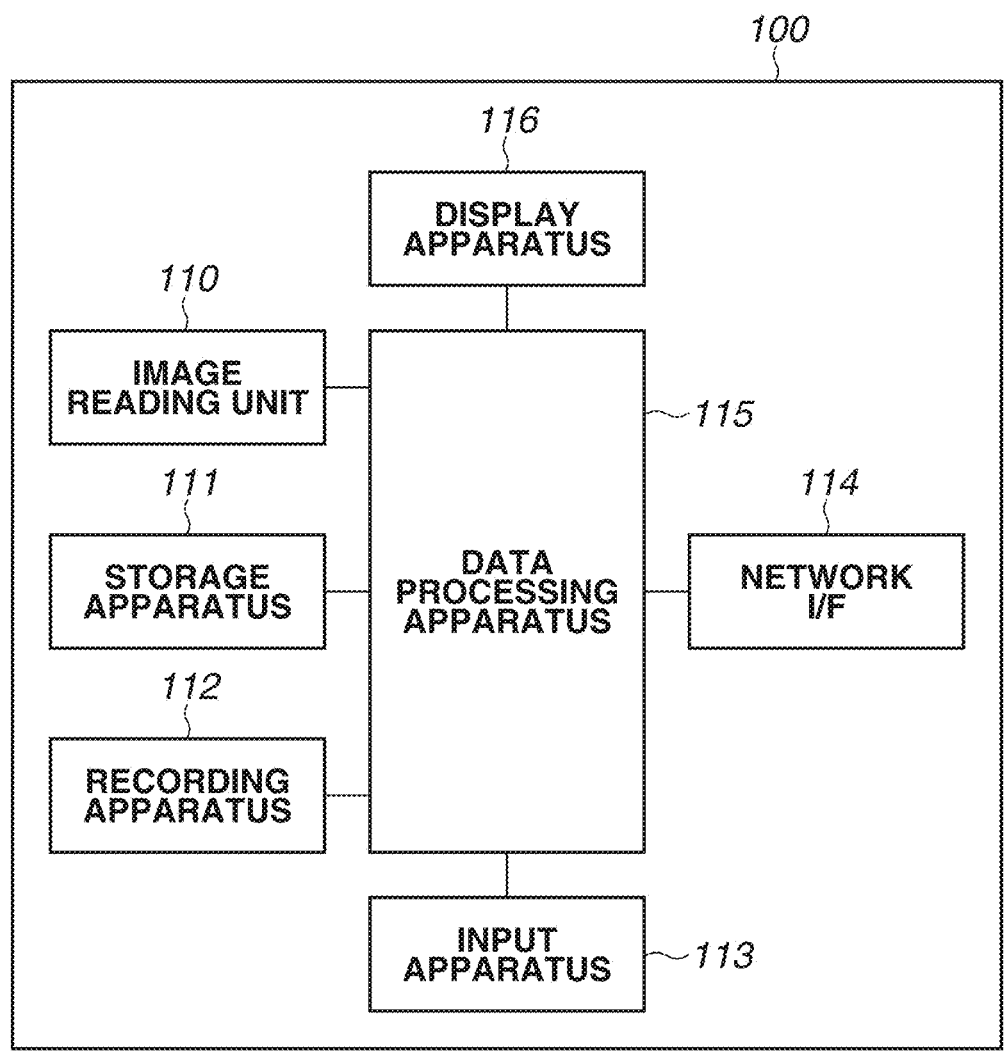
FIG. 2 is a block diagram illustrating a multifunction peripheral (MFP) in FIG. 1.

FIG. 2 is a block diagram illustrating a function configuration of the MFP 100 in FIG. 1. In FIG. 2, the MFP 100 includes an image reading unit 110, a storage apparatus (hereinbelow, referred to as BOX) 111, a recording apparatus 112, a data processing apparatus 115, an input apparatus 113, a display apparatus 116, and a network I/F 114. The image reading unit 110 including an auto document feeder (ADF), which is not illustrated, irradiates images on a bunch or a sheet of documents with a light source and forms a reflected image on a solid-state image sensor by a lens. The solid-state image sensor generates an image reading signal having a predetermined resolution (e.g. 600 dpi) and a predetermined brightness level (e.g. 8 bits), and image data including raster data is formed from the image reading signal. When a general copy function is executed, bitmap image data obtained by the image reading unit 110 is converted to a recording signal by performing scan image processing described below by the data processing apparatus 115, and then formed as an image (print output) by the recording apparatus 112. When a plurality of sheets are copied, a recording signal for one page is once stored in the BOX 111, then output in series to the recording apparatus 112 to form a record image on a recording sheet. The MFP 100 can receive page description language (PDL) data output from the client PC 101 (or another general PC (not illustrated)) using a driver via the LAN 102 and the network I/F 114 and record an image based on the received PDL data by the recording apparatus 112. In other words, PDL data output from the client PC 101 via the driver is input to the data processing apparatus 115 via the LAN 102 and the network I/F 114. The PDL data is converted to a recordable signal by being subjected to language interpretation and processing in the data processing apparatus 115, and then recorded as a record image on a recording sheet by the MFP 100.

The BOX 111 has a function for storing data obtained by rendering data from the image reading unit 110 and PDL data output from the client PC 101 via the driver. In addition, the MFP 100 can be operated via a key operation unit (the input apparatus 113) provided for the MFP 100 and display a state of the operation input by the display apparatus 116.

Figure 3:
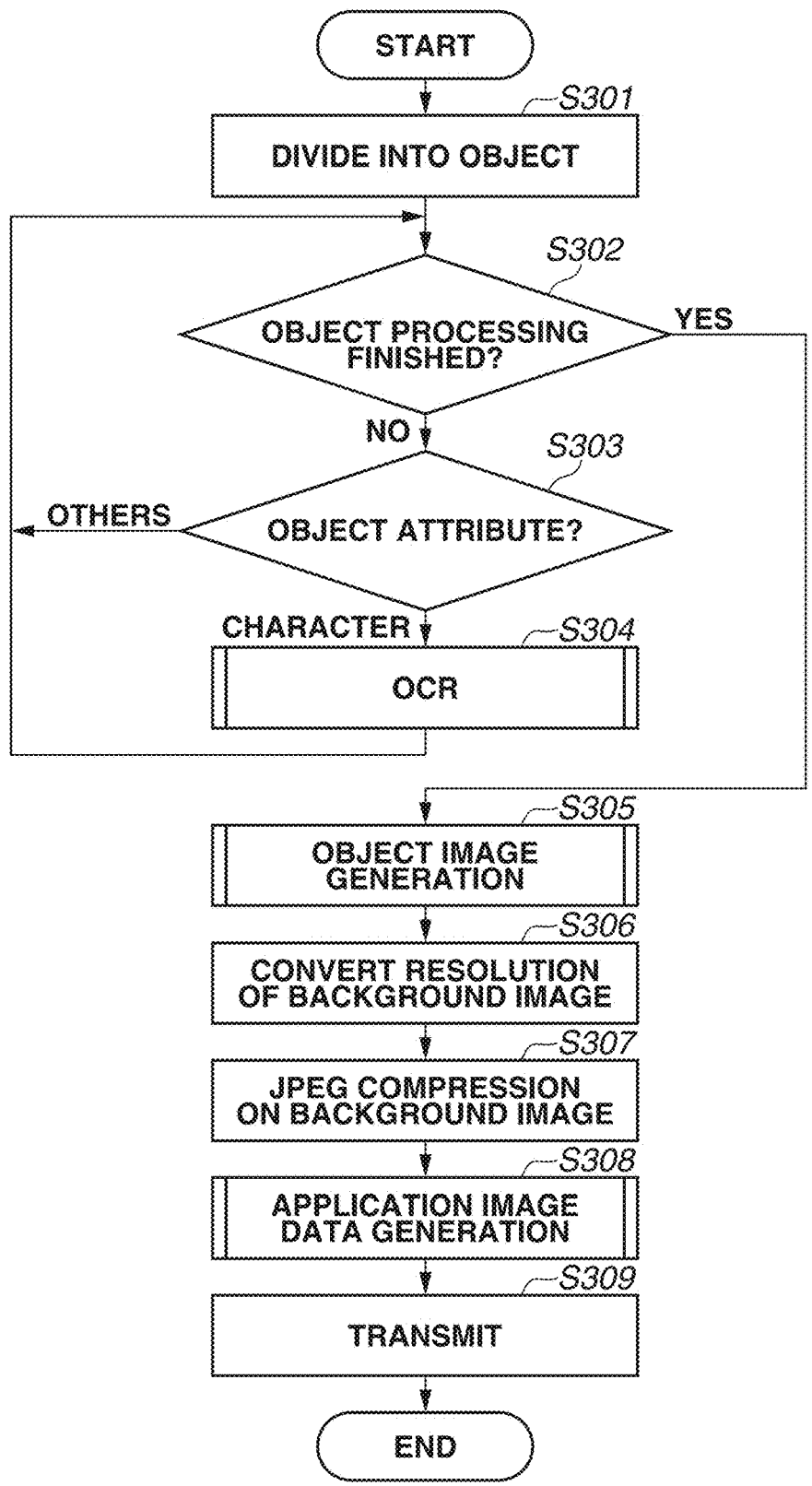
FIG. 3 is a flowchart illustrating processing for converting bitmap image data described according to the first exemplary embodiment.

FIG. 3 is a flowchart illustrating processing performed by the data processing apparatus 115 in the MFP 100 to convert bitmap image data to data having a predetermined format (hereinbelow, referred to as application image data) suitable for being displayed on the mobile information terminal 107. Bitmap image data is obtained by scanning a document by the image reading unit 110 in the MFP 100 or generated by rendering a document created by application software on the client PC 101 in the MFP 100.

First, in step S301, the data processing apparatus 115 performs object division processing (i.e. area identification processing) for dividing bitmap image data input as a processing target into an object of each attribute (an area of each attribute). Types of attributes of each object classified at the time of the object division processing include a character, a photograph, and a graphic (a drawing, a line drawing, a table, and a line). In the object division processing, an area of each object is identified by analyzing the image data. Next, in step S302, the data processing apparatus 115 determines whether there is any unprocessed object in the objects divided in step S301. If there is any unprocessed object (NO in step S302), the unprocessed object is set as a focused object of the processing target, and the processing proceeds to step S303. Whereas if processing is finished on all objects (YES in step S302), the processing proceeds to step S305.

In step S303, the data processing apparatus 115 determines whether an attribute of the focused object set as the processing target in step S302 is a character. If the attribute is a character (CHARACTER in step S303), then in step S304, the data processing apparatus 115 performs OCR processing on the focused object to obtain character coded data (character code data as an OCR result). Whereas, in step S303, if the attribute of the focused object is other than the character (OTHERS in step S303), the processing returns to step S302 to set a next unprocessed object as the processing target.

In step S305, the data processing apparatus 115 performs object image generation processing described below on each object divided in step S301. Next, in step S306, the data processing apparatus 115 converts resolution of entire bitmap image data input in step S301 as the processing target to generate a background image having resolution lower than that of the relevant bitmap image data. According to the present exemplary embodiment, a background image having ¼ resolution (for example, if resolution of bitmap image data is 600 dpi, a background image having resolution of 150 dpi) is generated by using the nearest neighbor method. The method for converting resolution is not limited to the nearest neighbor method, and a high precision interpolation method, such as the bilinear method and the bicubic method, can also be used.

In step S307, the data processing apparatus 115 performs Joint Photographic Experts Group (JPEG) compression on the background image generated in step S306 to generate a compressed background image.

In step S308, the data processing apparatus 115 puts data of each object obtained in step S305, data of the background image obtained in step S307, and the character code data obtained in step S304 into one file to generate application image data (namely, a document file formed by structuring each object) which can be displayed on the mobile information terminal 107. Then, in step S309, the data processing apparatus 115 transmits the generated file of the application image data to the mobile information terminal 107.

Figure 4:
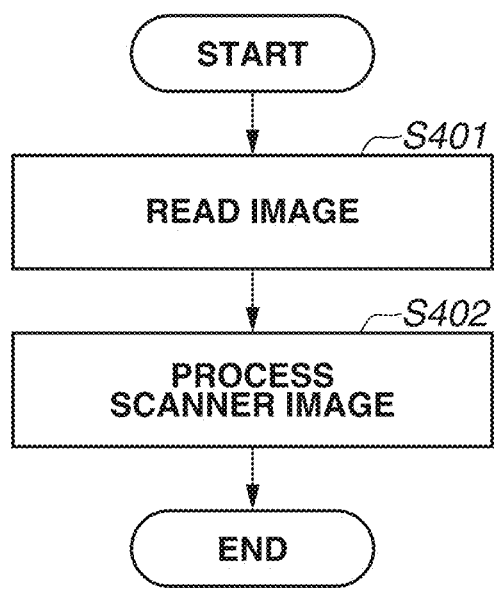
FIG. 4 is a flowchart illustrating processing for reading from a scanner described according to the first exemplary embodiment.
Figure 5:
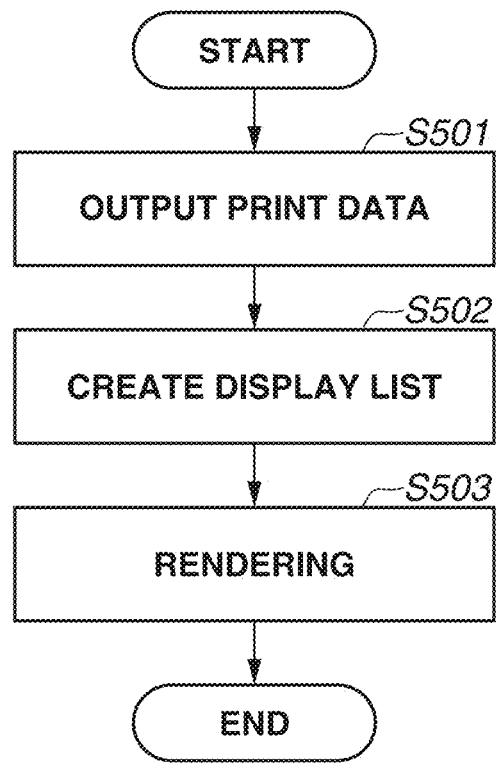
FIG. 5 is a flowchart illustrating processing for converting data from a personal computer (PC) to bitmap described according to the first exemplary embodiment.

How the bitmap image data input in step S301 as the processing target is generated is described with reference to FIGS. 4 and 5. FIG. 4 is a flowchart illustrating processing for generating bitmap image data using the image reading unit 110 in the MFP 100. FIG. 5 is a flowchart illustrating processing for generating bitmap image data using an application on the client PC 101. In other words, the above-described processing in FIG. 3 is performed on bitmap image data generated by the processing in FIG. 4 or 5.

When the image reading unit (i.e. a scanner) 110 in the MFP 100 is used, an image is obtained by scanning a document (a paper document) in step S401 in FIG. 4. Next, in step S402, scanner image processing depending on the characteristics of the image reading unit 110 is performed on the image obtained in step S401, so that the bitmap image data is generated. The scanner image processing mentioned here includes, for example, color processing and filtering processing.

When bitmap image data as the processing target is generated based on data obtained from the application on the client PC 101, the processing is performed as follows. First, in step S501 in FIG. 5, data created using the application on the client PC 101 is converted to print data via a print driver on the client PC 101 and transmitted to the MFP 100. The print data mentioned here means PDL and includes page description languages, for example, laser beam printer image processing system (LIPS) (trademark) and PostScript (trademark). Next, in step S502, an interpreter existing in the MFP 100 interprets the received PDL to generate a display list. Then, in step S503, a renderer existing in the MFP 100 performs rendering on the generated display list to generate bitmap image data.

Figure 7:
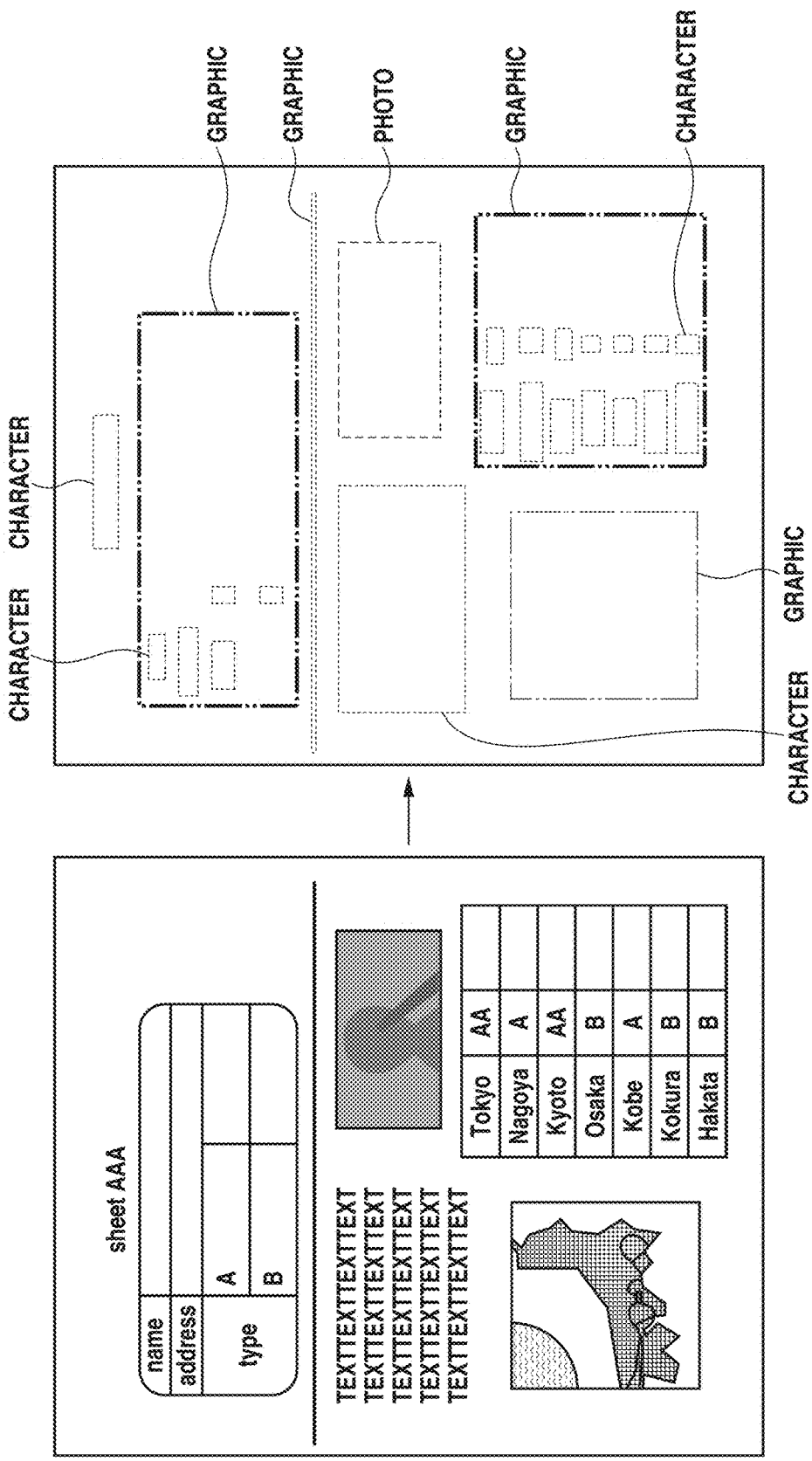
FIG. 7 is an example of a result of object division.

Next, data obtained by the object division processing in step S301 is described in detail below with reference to FIGS. 7 and 8. FIG. 7 is an example of a result obtained when bitmap image data is divided into a plurality of objects by the object division processing. FIG. 8 illustrates block information of each object at the time of object division and input file information.

When object division processing is performed on an input image as shown on the left side of FIG. 7, the image is divided into rectangular blocks of each attribute as shown on the right side of FIG. 7. As described above, attributes of rectangular blocks include a character, a photograph, and a graphic (a drawing, a line drawing, a table, and a line). A method for object division processing includes, for example, following methods. First, image data stored in a RAM (not illustrated) in the MFP 100 is binarized to black and white, and pixel blocks surrounded by black pixel contours are extracted. Further, a size of each extracted black pixel block is evaluated. The black pixel block of which size has a predetermined value or larger may include a character inside, so that an outline trace is performed with respect to a white pixel block in the black pixel block. As described as size evaluation of a white pixel block and trace of an internal black pixel block, as long as a size of an internal pixel block has the predetermined value or larger, extraction and outline trace of the internal pixel block are recursively performed. A size of a pixel block is evaluated by, for example, an area of the pixel block. Thus, a rectangular block circumscribing the pixel block obtained as described above is generated, and attributes thereof is determined based on a size and a shape of the rectangular block. For example, a rectangular block of which aspect ratio is close to one and of which size is within a certain range (a size generally used as a character) is regarded as a character equivalent block which may be a character area rectangular block. In addition, when adjacent character equivalent blocks are regularly aligned, a new rectangular block is generated by collecting these character equivalent blocks, and the new rectangular block is regarded as a character area rectangular block. Further, a black pixel block including flat pixel blocks or quadrangular white pixel blocks having a certain size or larger which are neatly aligned is regarded as a graphic area rectangular block, and another amorphous pixel block is regarded as a photograph area rectangular block.

Block information and input file information are generated for each of the rectangular blocks generated as above as illustrated in FIG. 8. In FIG. 8, the block information includes an attribute, a coordinate X and a coordinate Y of a position, a width W, a height H, and OCR information of each block. The attribute is indicated by a numerical value of 1 to 3, and 1 means a character area rectangular block, 2 means a photograph area rectangular block, and 3 means a graphic area rectangular block. The coordinate X and the coordinate Y are X- and Y-coordinates of a start point (coordinates of an upper left corner) of each rectangular block in an input image. The width W and the height H are a width in the X-coordinate direction and a height in the Y-coordinate direction of the rectangular block. The OCR information indicates presence or absence of pointer information for the character coded data obtained by the OCR processing in step S304. In addition, a total number of blocks (N) indicating the number of rectangular blocks is stored as the input file information.

The block information of each of these rectangular blocks is used in OCR processing and application image data generation processing described below. Further, the block information can be used for identifying a relative position relationship when a specific area is overlapped with another area, so that each area can be overlapped with each other without damaging a layout of an input image.

Figure 9:
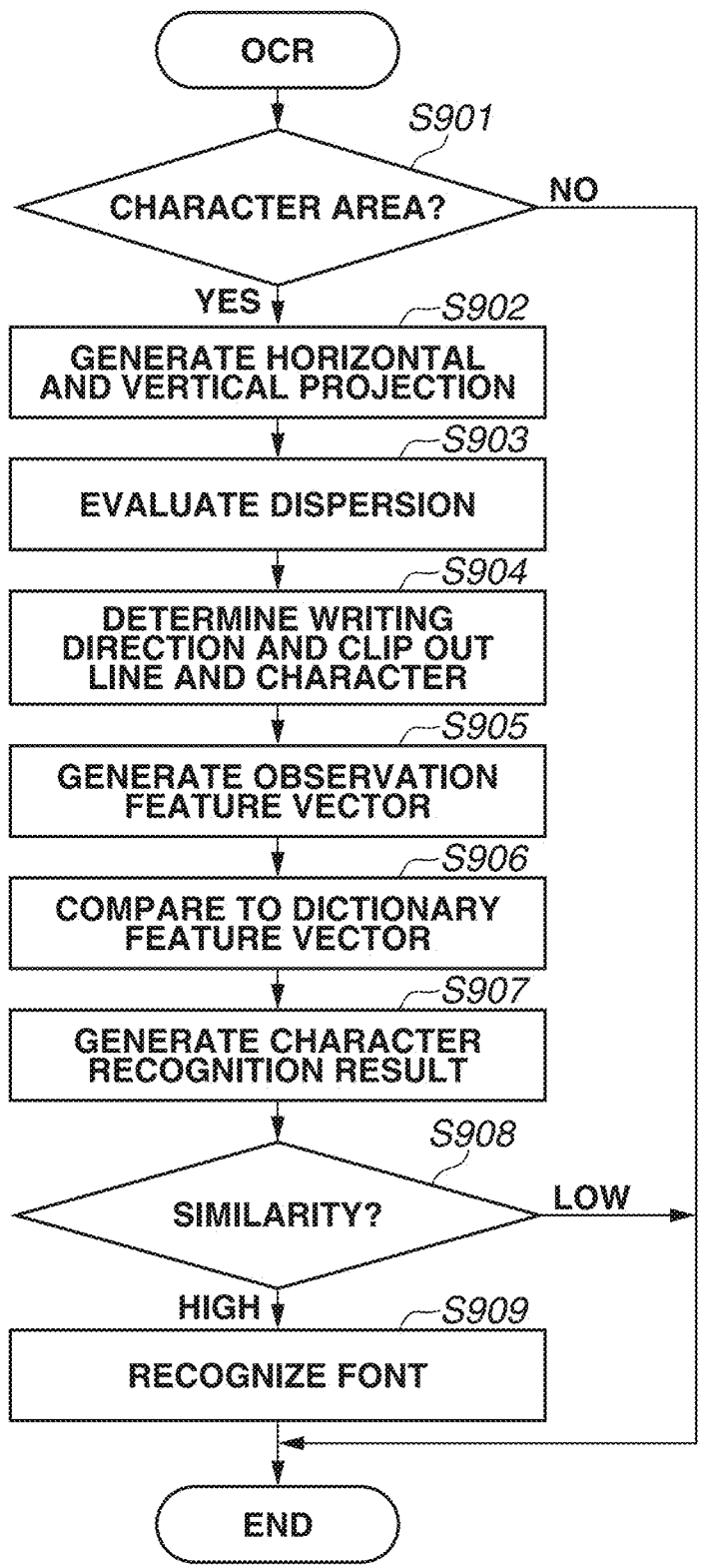
FIG. 9 is a flowchart illustrating optical character recognition (OCR) processing described according to the first exemplary embodiment.

Next, the OCR processing in step S304 in FIG. 3 is described in detail with reference to a flowchart in FIG. 9.

In step S901, the data processing apparatus 115 determines whether a specific area (the focused object of the processing target) is a character area rectangular block, and if the specific area is a character area rectangular block (YES in step S901), the data processing apparatus 115 advances the processing to step S902 and later. Whereas if the specific area is not a character area rectangular block (NO in step S901), the data processing apparatus 115 terminates the OCR processing.

In step S902 to step S907, the data processing apparatus 115 performs character recognition processing using a pattern matching method or the like to obtain a corresponding character code. For example, in step S902, the data processing apparatus 115 generates horizontal and vertical projections with respect to a pixel value in the specific area in order to determine whether the specific area is written horizontally or vertically (determination of a writing direction). Next, in step S903, dispersion of the projections in step S902 is evaluated. If the dispersion of the horizontal projection is large, it is determined as horizontal writing, and if the dispersion of the vertical projection is large, it is determined as vertical writing.

In step S904, the data processing apparatus 115 determines the writing direction based on an evaluation result in step S903 and clips out a line and then a character to obtain a character image. Decomposition to a character string and a character is performed as follows. In the case of the horizontal writing, a line is clipped out using the projection in the horizontal direction, and a character is clipped out using the projection in the vertical direction with respect to the clipped line. In the case of a character area in the vertical writing, reverse processing is performed in horizontal and vertical directions. When lines and characters are clipped out, a size of the character can also obtained.

Next, in step S905, the data processing apparatus 115 generates an observation feature vector of each character clipped out in step S904 by converting features obtained from the input image to a numeric string of dozens of dimensions. Various known methods can be used for extraction of a feature vector, for example, there is a method for dividing a character into meshes and regarding a mesh-number dimensional vector which is obtained by counting a character line in each mesh as a line element for each direction as a feature vector. In step S906, the data processing apparatus 115 compares the observation feature vector obtained in step S905 to a dictionary feature vector which is calculated for each font type in advance and calculates a distance between the observation feature vector and the dictionary feature vector. In step S907, the data processing apparatus 115 evaluates the distance calculated in step S906 and regards a character in the nearest distance as a recognition result.

Next, in step S908, the data processing apparatus 115 determines a similarity of whether the nearest distance of the distance evaluation in step S907 is larger than a predetermined value or not. If the nearest distance is the predetermined value or larger (similarity is low), it is highly possible that the character is erroneously recognized as a different character having a similar shape in the dictionary feature vector. Thus, if the nearest distance is the predetermined value or larger (similarity is LOW in step S908), the recognition result in step S907 is not adopted. In the case of the character of which nearest distance is less than the predetermined value (similarity is HIGH in step S908), the recognition result in step S907 is adopted, and the processing proceeds to step S909. In step S909, the data processing apparatus 115 recognizes a type of a character font. A plurality of dictionary feature vectors corresponding to the number of types of fonts used for character recognition is prepared for types of character shapes, namely types if fonts. When pattern matching is performed, a font type is output together with a character code using the dictionary feature vector, so that a character font can be recognized. According to the above-described processing, character code data is obtained from image information belonging to the character area rectangular block.

Figure 6:
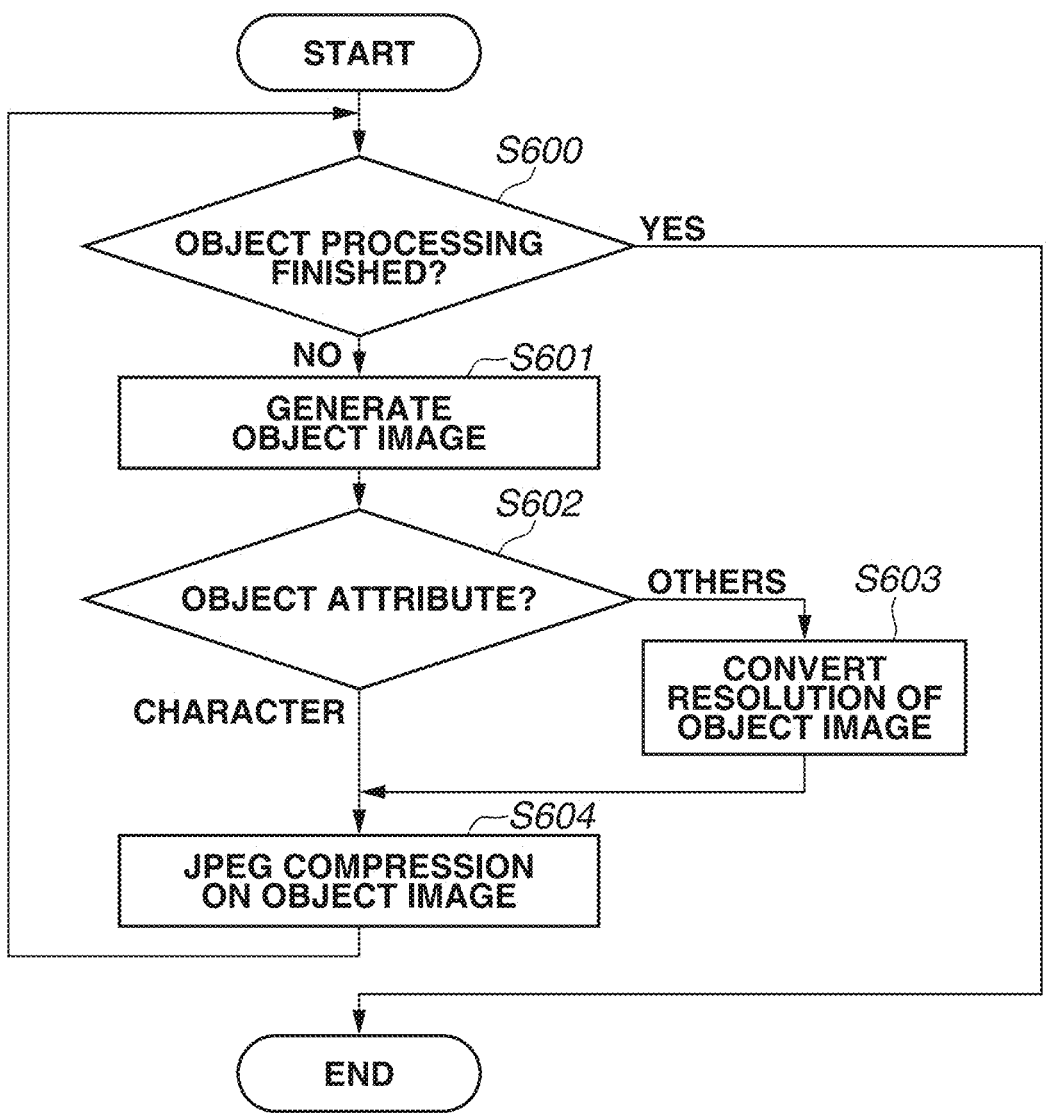
FIG. 6 is a flowchart illustrating processing for generating an object image described according to the first exemplary embodiment.

FIG. 6 is a flowchart illustrating details of the object image generation processing performed by the data processing apparatus 115 in step S305.

First, in step S600, the data processing apparatus 115 determines whether the processing is finished with respect to all objects divided in step S301. If there is any unprocessed object (NO in step S600), the data processing apparatus 115 sets one of the unprocessed objects as a processing target and performs the processing in step S601 and later. In step S601, the data processing apparatus 115 extracts an image in an area of the processing target object from an input bitmap image based on position information of the processing target object and generates an object image. In step S602, the data processing apparatus 115 determines whether an attribute type of the object is a character or not. If the attribute type of the object is a character (CHARACTER in step S602), the processing proceeds to step S604, and other than that (OTHERS in step S602), the processing proceeds to step S603.

In step S603, the data processing apparatus 115 performs resolution conversion on the object image generated in step S601 to convert the object image to an object image having resolution lower than that of the bitmap image data. According to the present exemplary embodiment, an object image having ½ resolution both in width and height, in other words, an object image having resolution of 300 dpi in the case of the bitmap image data having resolution of 600 dpi, is generated using the nearest neighbor method. As described above, in the object image generation processing according to the present exemplary embodiment, resolution conversion is not performed on an object having a character attribute which is often enlarged to be browsed, and resolution conversion is performed on an object having a photograph attribute or the like which is relatively rare to be enlarged. Accordingly, application image data can be generated while maintaining an appropriate image quality according to an attribute of an object and suppressing data to a less amount.

In step S604, the data processing apparatus 115 performs JPEG compression on the object image obtained in step S601 for the object having the character attribute and performs JPEG compression on the object image subjected to the resolution conversion in step S603 for the object having the attribute other than the character attribute. According to the present exemplary embodiment, it is described that resolution conversion is performed on an object having an attribute other than the character attribute with the exception of the character attribute. However, the present exemplary embodiment is not limited to the above-described configuration, and it is needless to say that it can be controlled not to perform resolution conversion, for example, on an object requiring further smoothness like a line. Further, it is needless to say that resolution can be controlled at more stages according to attributes of objects instead of two stages of the character and others as in the present exemplary embodiment.

Figure 13:
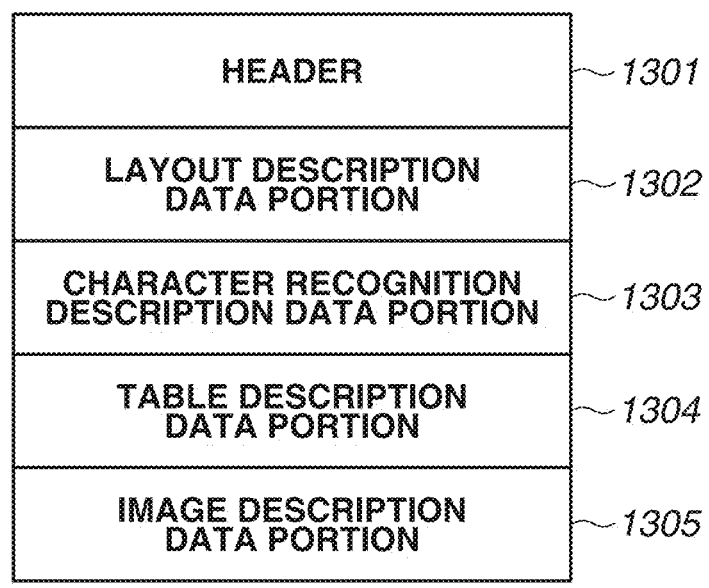
FIG. 13 is a map indicating intermediate data during a process of application image data generation processing described according to the first exemplary embodiment.
Figure 14:
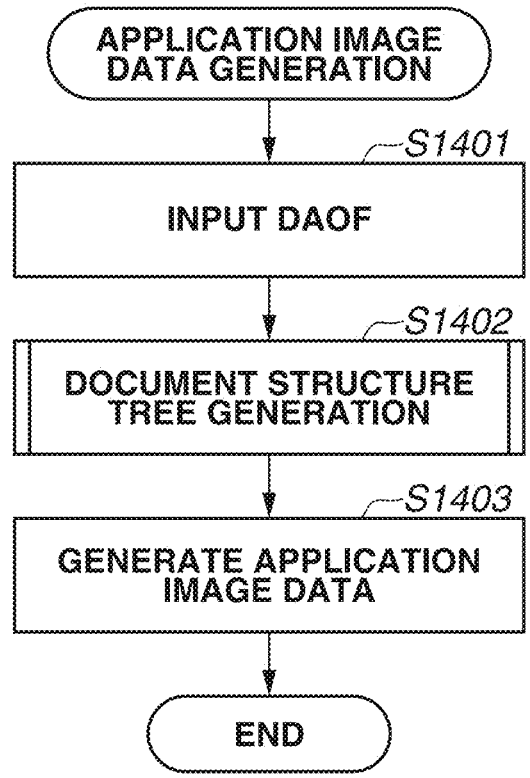
FIG. 14 is a flowchart illustrating processing for generating application image data.

Next, application image data generation in step S308 is described in detail with reference to FIGS. 13 and 14. FIG. 13 is a map indicating a data configuration of intermediate data generated during a process of application image data generation in FIG. 3 according to the present exemplary embodiment. FIG. 14 is a flowchart illustrating details of application image data generation processing.

First, in step S1401, the data processing apparatus 115 obtains the intermediate data generated by the processing in step S301 to step S307. According to the present exemplary embodiment, intermediate data is stored in a format referred to as a document analysis output format (DAOF) as described below. As shown in FIG. 13, the DAOF includes a header 1301, a layout description data portion 1302, a character recognition description data portion 1303, a table description data portion 1304, and an image description data portion 1305. The header 1301 stores information related to an input image of a processing target therein. The layout description data portion 1302 stores therein information of a character, a graphic (a drawing, a line drawing, a table, and a line), a photograph, and so on which are attributes of rectangular blocks in the input image and position information of each of those rectangular blocks of which attributes are recognized. The character recognition description data portion 1303 stores therein a character recognition result obtained by character recognition in character area rectangular blocks. The table description data portion 1304 stores therein details of a table structure of a graphic area rectangular block having a table attribute. The image description data portion 1305 stores therein a background image generated in step S307 and data divided into objects and generated by the object image generation processing.

Next, in step S1402, the data processing apparatus 115 performs document structure tree generation described below. In step S1403, the data processing apparatus 115 obtains actual data in the DAOF based on the document structure tree and generates application image data described below.

Figure 15:
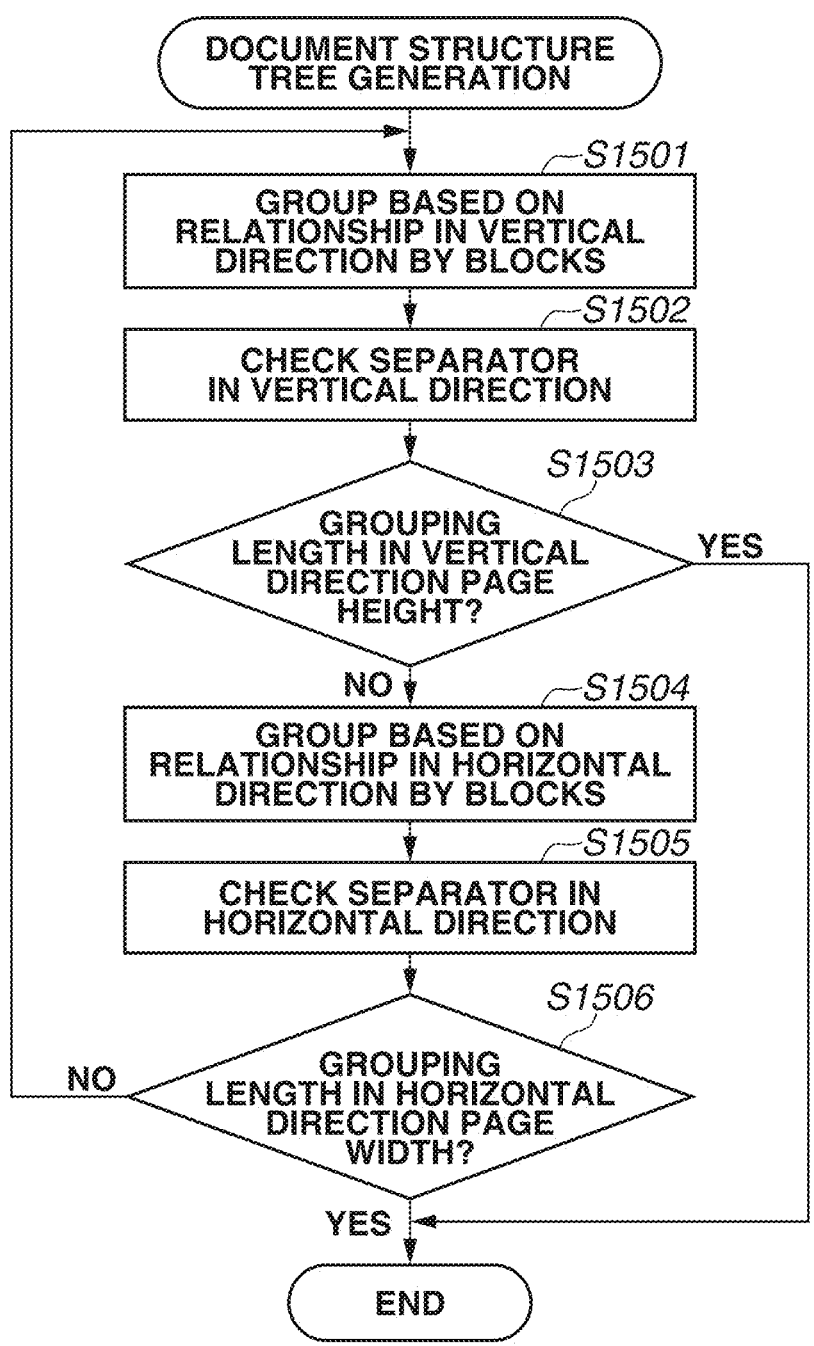
FIG. 15 is a flowchart illustrating processing for generating a document structure tree.
Figure 16:
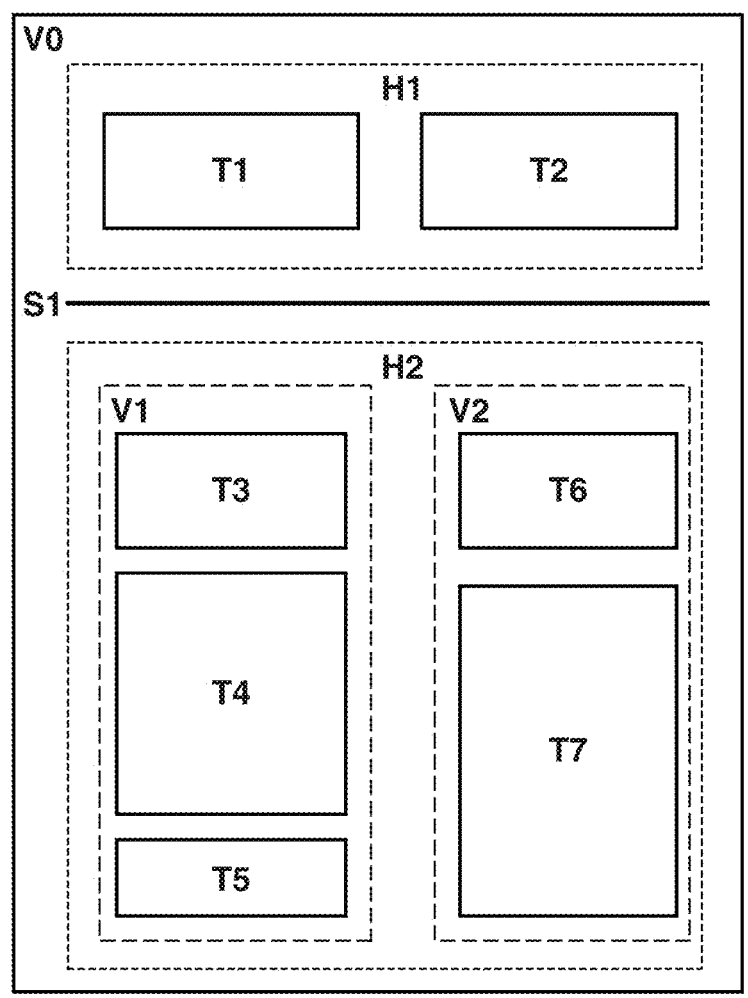
FIG. 16 is a drawing indicating a document subjected to document structure tree generation processing.
Figure 17:
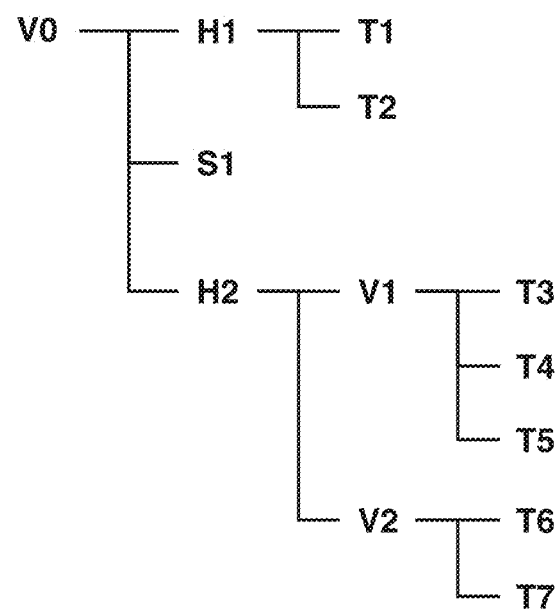
FIG. 17 is a drawing indicating a document structure tree generated by processing in FIG. 16.

The document structure tree generation processing in step S1402 is described in detail with reference to FIGS. 15, 16 and 17. FIG. 15 is a flowchart illustrating the document structure tree generation processing. FIG. 16 is an outline drawing indicating a position of each object obtained in step S301 in a document as a target of the document structure tree generation processing. FIG. 17 is a drawing indicating a document structure tree generated by the document structure tree generation processing.

As a basic rule for entirely controlling the document structure tree generation processing illustrated in FIG. 15, a processing flow is shifted from a micro block (a single rectangular block indicating each object) to a macro block (an aggregation of rectangular blocks). In the following descriptions, a "rectangular block" means both of a micro block and a macro block.

First, in step S1501, the data processing apparatus 115 groups the rectangular blocks based on a relationship in the vertical direction by rectangular block unit. The processing in step S1501 may be sometimes repeated, however, determination is made by micro block unit immediately after the start of the processing. In this regard, the relationship is defined by features, such that a distance is short, and a block width is approximately same (a block height in the case of the horizontal direction). In addition, information pieces about a distance, a width, a height, and so on are extracted by referring to the DAOF. For example, in a document illustrated in FIG. 16, rectangular blocks T1 and T2 are arranged in parallel in the horizontal direction in an uppermost part. A horizontal direction separator S1 is located below the rectangular blocks T1 and T2, and rectangular blocks T3, T4, T5, T6, and T7 are located below the horizontal direction separator S1. The rectangular blocks T3, T4, and T5 are arranged from top to bottom in the vertical direction on a left half of an area below the horizontal direction separator S1, and the rectangular blocks T6 and T7 are arranged one above the other on a right half of the area below the horizontal direction separator S1. When the grouping processing based on the relationship in the vertical direction is executed in step S1501, the rectangular blocks T3, T4, and T5 are collected into one group (rectangular block) V1, and the rectangular blocks T6 and T7 are collected into one group (rectangular block) V2. The groups V1 and V2 are in the same hierarchy.

Next, in step S1502, the data processing apparatus 115 checks presence or absence of a vertical direction separator. A separator is an object having a line attribute in the DAOF and has a function of explicitly dividing blocks. When a vertical direction separator is detected, the area of the input image is divided into right and left using the separator as a boundary in the hierarchy of the processing target. In FIG. 16, there is no vertical direction separator.

Next, in step S1503, the data processing apparatus 115 determines whether to finish the processing by determining whether all rectangular blocks are grouped into one macro block. When the grouping is finished (YES in step S1503), the processing is terminated. Whereas if the grouping is not finished yet (NO in step S1503), the processing proceeds to step S1504.

Next, in step S1504, the data processing apparatus 115 performs grouping processing based on a relationship in the horizontal direction. Accordingly, for example, the rectangular blocks T1 and T2 in FIG. 16 are collected into one group (rectangular block) H1, and the rectangular blocks V1 and V2 are collected into one group (rectangular block) H2. The groups H1 and H2 are in the same hierarchy. Next, in step S1505, the data processing apparatus 115 checks presence or absence of a horizontal direction separator. When a horizontal direction separator is detected, the area of the input image is divided into top and bottom using the separator as a boundary in the hierarchy of the processing target. In FIG. 16, there is the horizontal direction separator S1.

Next, in step S1506, the data processing apparatus 115 determines whether to finish the processing by determining whether all rectangular blocks are grouped into one macro block. When the grouping is finished (YES in step S1506), the processing is terminated. Whereas if the grouping is not finished yet (NO in step S1506), the processing returns to step S1501. In the example in FIG. 16, the processing returns to step S1501, and the rectangular blocks H1, S1, and H2 are collected into one group (rectangular block) V0.

Results of the above-described processing are registered as a tree illustrated in FIG. 17. In FIG. 17, in bitmap image data V0 of an input page, the highest hierarchy includes the groups H1 and H2 and the separator S1, and the group H1 includes the rectangular blocks T1 and T2 belonging to the second hierarchy. The group H2 includes the groups V1 and V2 belonging to the second hierarchy. The group V1 includes the rectangular blocks T3, T4, and T5 belonging to the third hierarchy, and the group V2 includes the rectangular blocks T6 and T7 belonging to the third hierarchy. According to the present exemplary embodiment, the group V0 indicates an entire page, and items belonging to the lower hierarchy of the group V0 are objects.

Next, generation of application image data and an example of a format according to the present exemplary embodiment are described with reference to FIG. 18. According to the present exemplary embodiment, a scalable vector graphics (SVG) format is described as a format of application image data.

In FIG. 18, descriptions 1801, 1802, and 1804 of a background and each object of a page are indicated by surrounding with frames for explanation. The background and each object of a page include area information indicating an area thereof and a drawing element obtained from the actual data in the DAOF.

First, a background is obtained from a page V0 in the DAOF. The description 1801 indicates the background of the page and includes area information indicating an area of the background and a link to a background image generated in step S308 as a drawing element therein. Next, regarding each object in the lower hierarchy of the page V0 in the DAOF, groups are generated in the same hierarchy as the description 1801 of the background, and each object is generated in the lower hierarchy thereof. The description 1802 indicates a character attribute and includes area information of a character object and a link to an object image generated in step S305 as a drawing element. The character object further includes description 1803 indicating character code data and a character size both obtained by the OCR processing in step S304. In addition, the writing direction of the character area (i.e., vertical writing or horizontal writing) obtained by the OCR processing in step S304 can be included in the description 1802. The description 1804 indicates a photograph attribute and includes area information and a drawing element of a photograph object. Further, for example, regarding the objects H1, H2, V1, and V2 in the lower hierarchy shown in FIG. 17, groups are generated in an upper hierarchy of the objects and the objects are generated in the lower hierarchy of the groups.

According to the present exemplary embodiment, application image data (a structured document) is described in the SVG format. However, a format is not limited to this, and any image format can be used as long as it can describe and store a meaning and a structure of the document.

Figure 19:
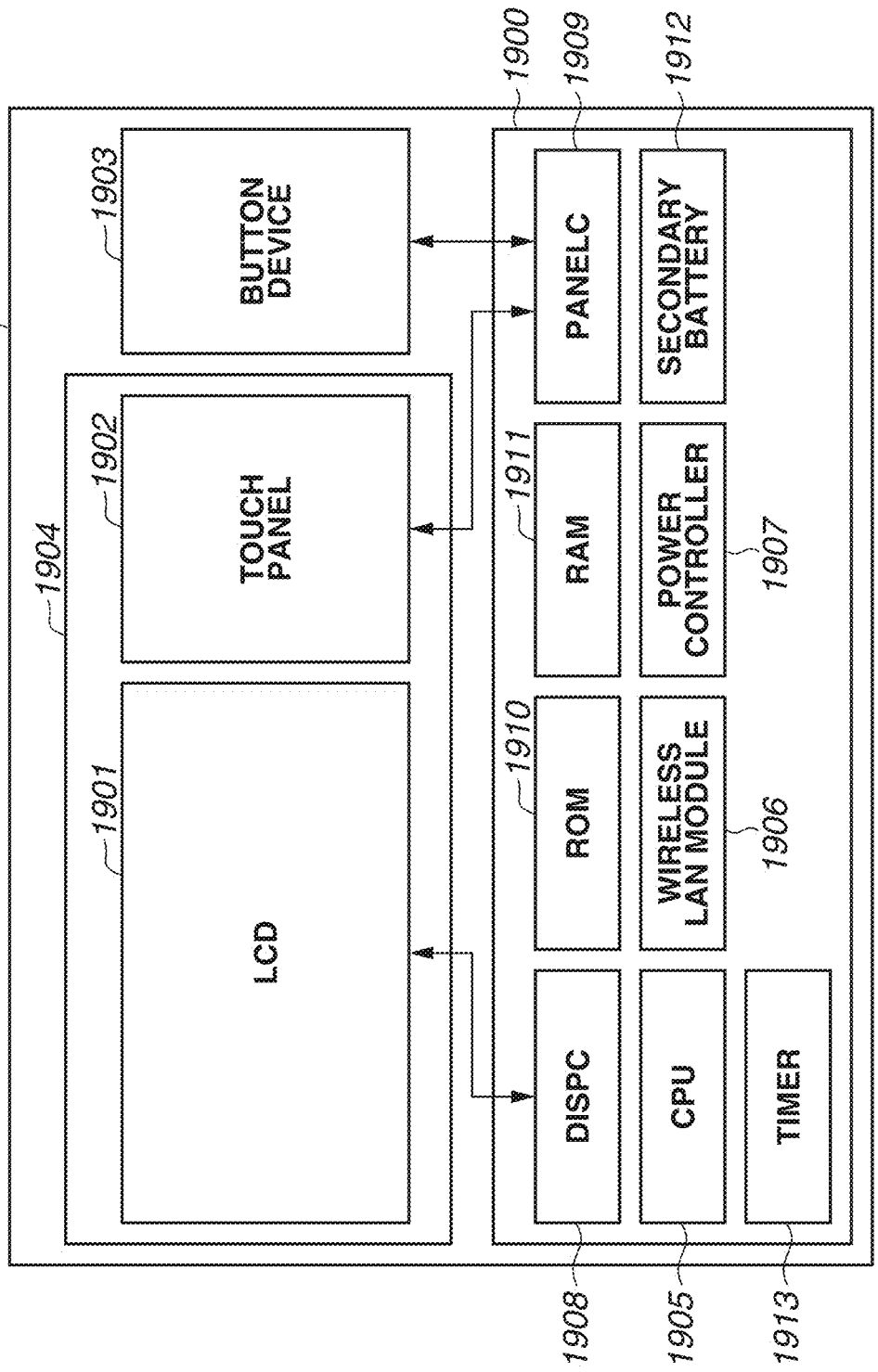
FIG. 19 is a block diagram illustrating a configuration of a mobile information terminal.

FIG. 19 is a block diagram illustrating a configuration example of the mobile information terminal 107 according to the present exemplary embodiment. The mobile information terminal 107 includes a main board 1900, a liquid crystal display (LCD) 1901, a touch panel 1902, and a button device 1903. The LCD 1901 and the touch panel 1902 are collectively referred to as a touch UI 1904.

The main board 1900 mainly includes the following components. They are, a CPU 1905, a wireless LAN module 1906, a power controller 1907, a display controller (DISPC) 1908, a panel controller (PANELC) 1909, a ROM 1910, a RAM 1911, a secondary battery 1912, and a timer 1913. The modules 1905 to 1913 are respectively connected to a bus (not illustrated).

The CPU 1905 is a processor to control each device connected to the bus and also develops and executes a below-described software module 2000 stored in the ROM 1910 in the RAM 1911. The RAM 1911 functions as a main memory and a work area of the CPU 1905, a video image area for displaying on the LCD 1901, and a storage area of the application image data transmitted from the MFP 100.

The display controller (DISPC) 1908 switches a video image output developed in the RAM 1911 to the one in high-speed in response to a request from the CPU 1905 and outputs a synchronization signal to the LCD 1901. Accordingly, a video image in the RAM 1911 is output to the LCD 1901 in synchronization with the synchronization signal of the DISPC 1908, and an image is displayed on the LCD 1901.

The panel controller (PANELC) 1909 controls the touch panel 1902 and the button device 1903 in response to a request from the CPU 1905. According to the control by the PANELC 1909, a pressed position on the touch panel 1902 where a user pressed by an indicating device, such as his/her finger or a stylus pen and a pressed key code of the button device 1903 are notified to the CPU 1905. Pressed position information is expressed by a coordinate value indicating an absolute position in the horizontal direction (hereinbelow, an x-coordinate) and a coordinate value indicating an absolute position in the vertical direction (hereinbelow, a y-coordinate) of the touch panel 1902. The touch panel 1902 can detects pressing on a plurality of positions, and in that case, the CPU 1905 is notified of the pressed position information pieces corresponding to the number of the pressed points.

The power controller 1907 is connected to an external power source (not illustrated) and receives power supply therefrom. Accordingly, the secondary battery 1912 connected to the power controller 1907 is charged, and the power is supplied to the entire mobile information terminal 107. When the power is not supplied from the external power source, the power from the secondary battery 1912 is supplied to the entire mobile information terminal 107.

The wireless LAN module 1906 establishes a wireless communication between a wireless LAN module on a wireless access point (not illustrated) connected to the LAN 102 based on the control by the CPU 1905 and intermediates communication between the mobile information terminal 107. The wireless LAN module 1906 includes, for example, the Institute of Electrical and Electronics Engineers (IEEE) 802.11b compatible one.

The timer 1913 generates timer interruption to a gesture event generation unit 2001 based on the control by the CPU 1905. The gesture event generation unit 2001 is described below. Further, in the mobile information terminal 107, a geomagnetic sensor (not illustrated) and an acceleration sensor (not illustrated) are connected to the bus (not illustrated). The CPU 1905 detects a tilt of the mobile information terminal 107 with the sensors, and when the tilt of the mobile information terminal 107 becomes a predetermined value or more, the CPU 1905 changes an orientation of the mobile information terminal 107 and transmits an instruction to a drawing unit 2003 for drawing on the LCD 1901. When the orientation of the mobile information terminal 107 is changed, the CPU 1905 switches the width and the height of the LCD 1901 and performs the processing thereafter.

Figure 20:
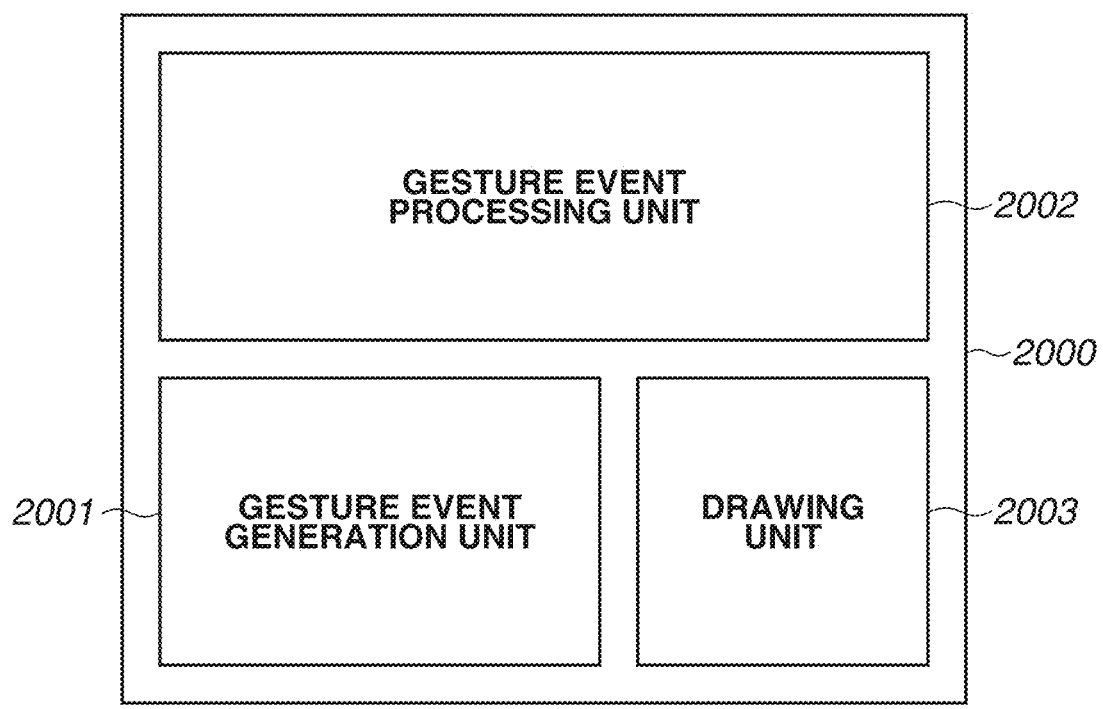
FIG. 20 is a block diagram illustrating a configuration of a software module of a mobile information terminal.

FIG. 20 is a block diagram illustrating a configuration of the software module 2000 which is executed and processed by the CPU 1905 in the mobile information terminal 107. The CPU 1905 functions as each of processing units for executing processing illustrated in the following flowcharts by executing a computer program. Each module included in the software module 2000 is described below.

The gesture event generation unit 2001 generates below-described various gesture events in response to a touch input from a user. The gesture event generation unit 2001 transmits the generated gesture event to a gesture event processing unit 2002. The gesture event processing unit 2002 receives the gesture event generated by the gesture event generation unit 2001 and executes processing corresponding to each gesture event and the document structure described in the application image data. The drawing unit 2003 draws an image based on the application image data transmitted from the MFP 100 on the LCD 1901 according to an execution result by the gesture event processing unit 2002. A method for displaying the application image data is described below.

Next, FIGS. 21A to 21L indicate lists of gesture event names generated by the gesture event generation unit 2001 and information pieces to be transmitted to the gesture event processing unit 2002 when the respective events are generated.

FIG. 21A indicates a touch pressing event, and a coordinate value of a latest touched coordinate and the number of touched coordinates are transmitted. A touched coordinate is a coordinate of one point where a user touches with his/her finger on the touch panel 1902 and has a pair of coordinate values indicated by x-coordinate and y-coordinate. Further, the number of touched coordinates is the number of coordinates where the user touched with his/her finger on the touch panel 1902. The touched coordinate is updated when a user's finger touches, moves, and takes off of the touch panel 1902, and when interruption from the timer 1913 is generated.

FIG. 21B indicates a swipe event, and a coordinate value of the latest touched coordinate and a moving distance calculated from a difference between the latest coordinate value and a coordinate value immediately before the latest one are transmitted. In this regard, swipe is a motion to move a fingertip in one direction (like sliding) while touching on the touch panel 1902.

FIG. 21C indicates a pinch-in event, and a center coordinate value of the latest two touched coordinates where a user simultaneously touched with two fingers and a reduction ratio of the pinch-in event calculated from a reduction distance of a straight line connecting the two touched coordinates are transmitted. Pinch-in is a motion of a user to move two fingertips closer to each other (like pinching) while touching on the touch panel 1902.

FIG. 21D indicates a pinch-out event, and a center coordinate value of the latest two touched coordinates where a user simultaneously touched with two fingers and a pinch-out enlargement ratio calculated from an enlargement distance of a straight line connecting the two touched coordinates are transmitted. Pinch-out is a motion to move two fingertips away from each other (like spreading fingers away) while touching on the touch panel 1902.

FIG. 21E indicates a two point swipe event, and coordinate values of the latest two touched coordinates where a user simultaneously touched with two fingers and a moving distance calculated from a difference between coordinate values of the latest two touched coordinates and the two touched coordinates immediately before the latest ones are transmitted. A two point swipe event is generated when two touched coordinates move in the same direction.

FIG. 21F indicates a rotation event, and a center coordinate value of a rotation calculated from coordinate values of the latest two touched coordinates and a rotation angle calculated from coordinate values of the latest two touched coordinates and the two touched coordinates immediately before the latest ones are transmitted. Rotation is a motion to rotate two fingertips with respect to the touch panel 1902 while touching on the touch panel 1902.

FIG. 21G indicates a flick event, and a coordinate value of the latest touched coordinate and a moving speed of a finger calculated from the latest coordinate value and a coordinate value immediately before the latest one are transmitted. Flick is a motion to take off a finger (like flicking a finger) while swiping.

FIG. 21H indicates a touch release event, and a coordinate value of the latest touched coordinate and the number of coordinates when a user takes off his/her finger from the touch panel 1902.

FIG. 21I indicates a double-tap event, and a coordinate value of the latest touched coordinate is transmitted. Double-tap means that a below-described single-tap event is generated twice within a predetermined time length.

FIG. 21J indicates a single-tap event, and a coordinate value of the latest touched coordinate is transmitted. Single-tap means that a touch release event is generated within a predetermined time length after the touch pressing event occurred.

FIG. 21K indicates a long-tap event, and a coordinate value of the latest touched coordinate is transmitted. Long-tap means that a touch release event is generated when a predetermined time length or more has elapsed after the touch pressing event occurred.

FIG. 21L indicates a touch and hold event, and a coordinate value of the latest touched coordinate is transmitted. Touch and hold means that a predetermined time length or more has elapsed since a user touched on the touch panel 1902 with his/her finger and stays there without moving.

In this description, touch inputs using a finger is described as an example of user's touch inputs, however, touch inputs may be made by a stylus pen or the like.

Figure 22:
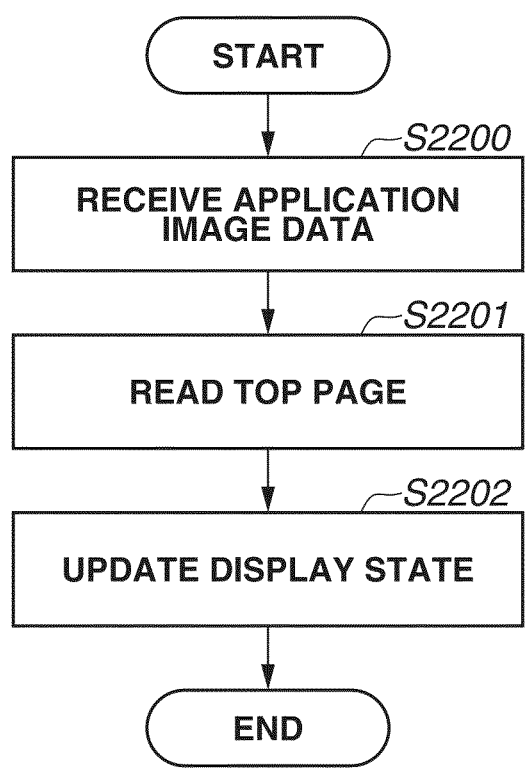
FIG. 22 is a flowchart illustrating processing when a mobile information terminal receives application image data.
Figure 23:
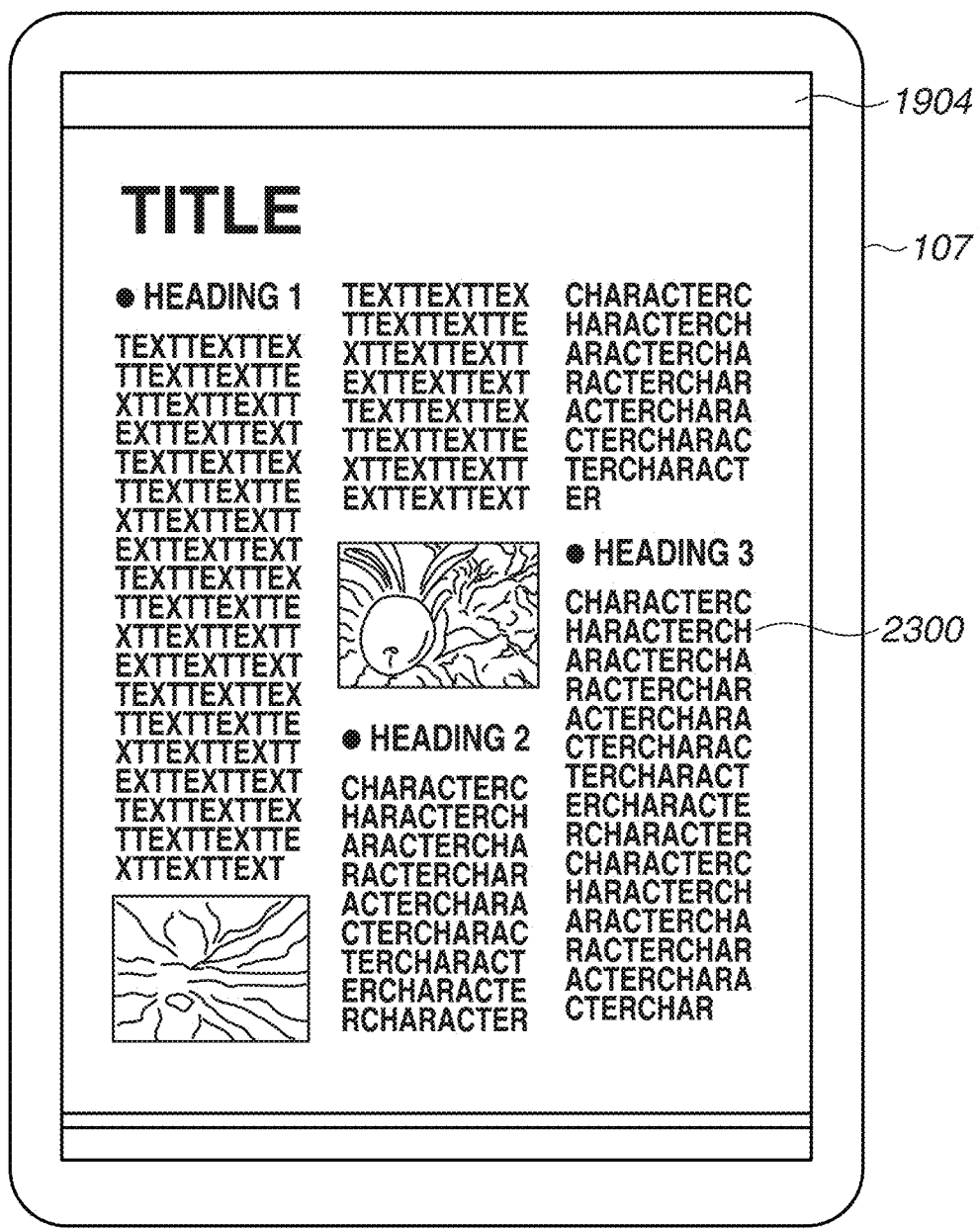
FIG. 23 is an example of screen display of a touch user interface (UI) on a mobile information terminal.

Next, processing performed when the application image data is received by the mobile information terminal 107 according to the present exemplary embodiment is described with reference to FIGS. 22 and 23. FIG. 22 is a flowchart illustrating processing when the mobile information terminal 107 receives application image data. FIG. 23 is an example of a screen display on the touch UI 1904 of the mobile information terminal 107 according to the present exemplary embodiment.

First, in step S2200, when receiving the application image data from the MFP 100 via the wireless LAN module 1906, the mobile information terminal 107 stores the received application image data in the RAM 1911. Next, in step S2201, the mobile information terminal 107 analyzes syntax of the application image data stored in the RAM 1911 and reads a top page of the data. Next, in step S2202, the drawing unit 2003 renders a background included in the read top page according to a coordinate of a start point and a width and a height of area information and updates a display state of the touch UI 1904. In this processing, a display magnification of the top page is controlled so as to fit a width (a horizontal length) of the top page into a width of the touch UI 1904 as shown in a page 2300 in FIG. 23. If a height (a vertical length) of the page is smaller than a height of the touch UI 1904 when the page is displayed with reduction at the display magnification, the start point of the page 2300 is controlled so that the page 2300 is displayed on the center of the touch UI 1904 on coordinates of the touch UI 1904. Further, if the height of the page 2300 is larger than the height of the touch UI 1904 when the page 2300 is reduced at the display magnification, the start point of the page 2300 is controlled to fit to a start point (for example, an upper left point on the screen) of the touch UI 1904 on the coordinates of the touch UI 1904. A display control method for displaying an entire page with reduction according to a page width on the touch UI 1904 as described above is referred to as a "page display mode" according to the present exemplary embodiment.

Figure 24:
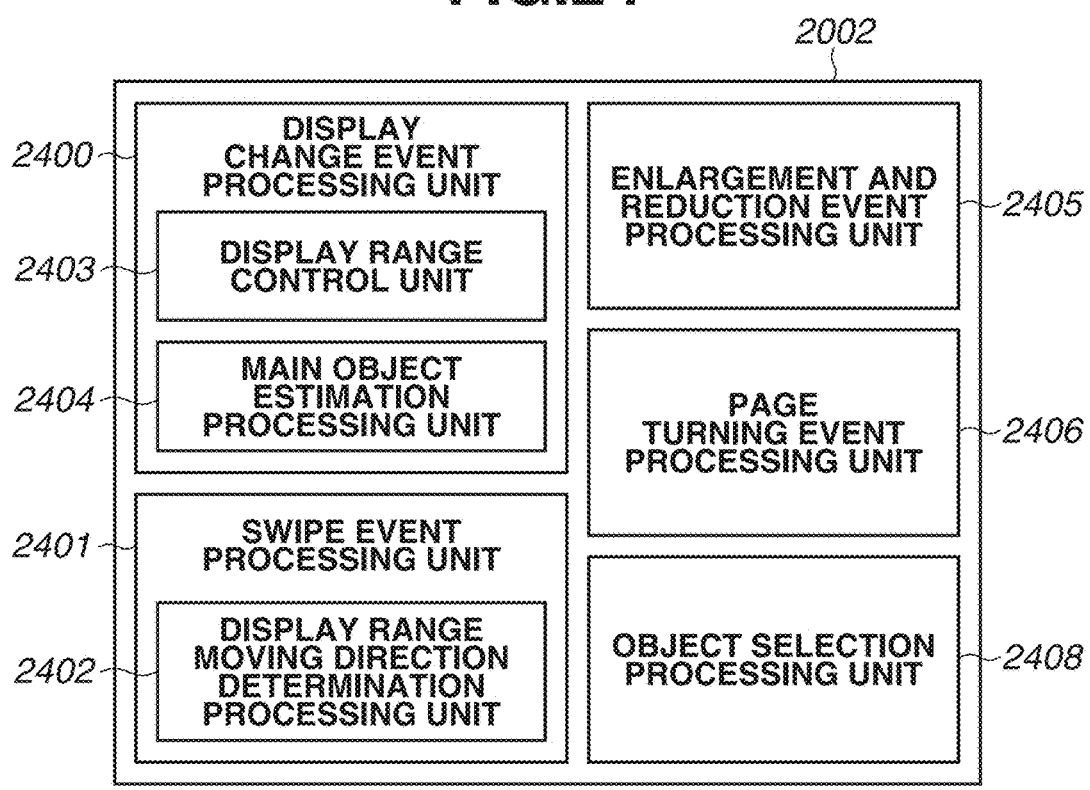
FIG. 24 is a block diagram illustrating a configuration of a software module related to operation control of application image data.

FIG. 24 is a block diagram illustrating a configuration of a software module related to operation control of application image data by the gesture event processing unit 2002 in the mobile information terminal 107.

The gesture event processing unit 2002 receives a gesture event indicated in FIGS. 21A to 21L from the gesture event generation unit 2001. A display change event processing unit 2400 performs processing with respect to a single-tap event (FIG. 21J) among gesture events that the gesture event processing unit 2002 receives. When a single-tap event is received, the display change event processing unit 2400 determines whether a coordinate value of the touched coordinate of the single-tap event is on the page 2300 in FIG. 23. If the touched coordinate of the single-tap event is on the page 2300, the display change event processing unit 2400 performs mode switch processing described below. In addition, a main object estimation processing unit 2404 in the display change event processing unit 2400 performs processing described below when receiving an event related to an operation, such as movement, enlargement, and reduction of the page 2300 and estimates and reads an object to be a next main object.

A swipe event processing unit 2401 performs processing with respect to a swipe event in FIG. 21B and a touch release event in FIG. 21H generated after the swipe operation. When a swipe event is received, the gesture event processing unit 2002 performs page movement processing described below and moves the page 2300 on the coordinates of the touch UI 1904 according to a moving distance of the swipe event. In addition, a display range moving direction determination processing unit 2402 in the swipe event processing unit 2401 performs display range moving direction determination processing described below and determines a moving direction of a display range of a page to be moved when the swipe operation is continuously performed. Further, when a touch release event is received after the swipe operation is performed, the display range moving direction determination processing unit 2402 performs page movement processing and processing for changing the swipe start point to be used for display range moving direction determination processing to an unset state, which are described below.

A page turning event processing unit 2406 performs processing with respect to a flick event in FIG. 21G. When a flick event is received, the gesture event processing unit 2002 updates the page 2300 displayed on the touch UI 1904 according to a moving speed of the flick event and coordinate values of the latest touched coordinate and the touched coordinate immediately before the latest one. More specifically, if the moving speed is a predetermined value or more and the latest touched coordinate is moved to right of the touch UI 1904 to a predetermined value or more than the touched coordinate immediately before the latest one, the gesture event processing unit 2002 analyzes the syntax of the application image data stored in the RAM 1911 and reads a next page of the data. In this regard, if the top page of the application image data stored in the RAM 1911 is read to the currently displayed page 2300, a page is not read. Further, if the moving speed is the predetermined value or more and the latest touched coordinate is moved to left of the touch UI 1904 to a predetermined value or more than the touched coordinate immediately before the latest one, the gesture event processing unit 2002 analyzes the syntax of the application image data stored in the RAM 1911 and reads a next page of the data. In this regard, if a last page of the application image data stored in the RAM 1911 is read to the currently displayed page 2300, a page is not read. Furthermore, if a previous page or a next page is read by the above-described processing, a display range control unit 2403 controls the display magnification of the page according to the width of the touch UI 1904 and also controls a start point of the page to determine a display range of the page. Then, the display state of the touch UI 1904 is updated based on the determined page display range.

An enlargement and reduction event processing unit 2405 performs processing with respect to a pinch-in event in FIG. 21C and an pinch-out event in FIG. 21D. When a pinch-in event or a pinch-out event is received, the gesture event processing unit 2002 performs page magnification change processing described below. The page magnification change processing controls a start point and the display magnification of the page 2300 to be changed according to the reduction ratio and the enlargement ratio of the two events and then updates the display state of the touch UI 1904.

An object selection processing unit 2408 performs processing with respect to a double-tap event in FIG. 21I. When a double-tap event is received, the gesture event processing unit 2002 performs object selection processing described below using a coordinate value of the touched coordinate of the double-tap event.

Figure 25:
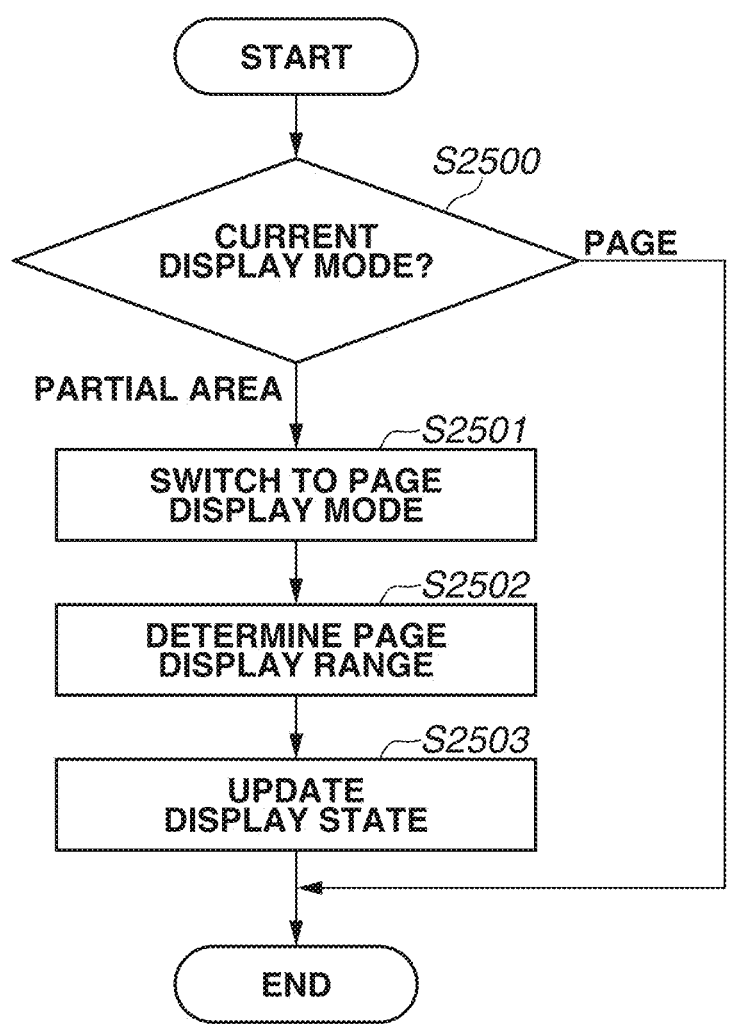
FIG. 25 is a flowchart illustrating mode switch processing described according to the first exemplary embodiment.
Figure 26A:
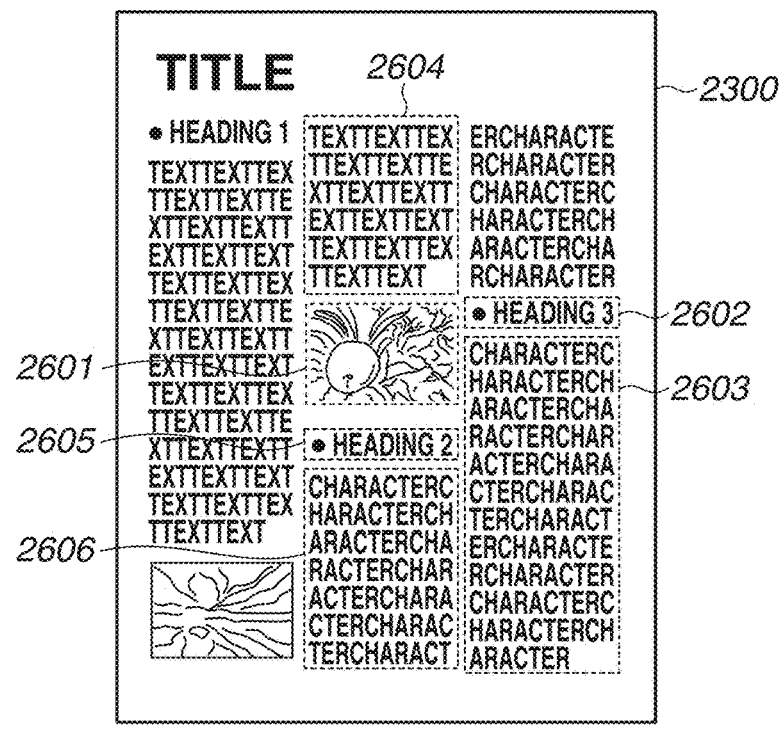
FIGS. 26A and 26B are examples of screen display of a touch UI on a mobile information terminal.
Figure 26B:
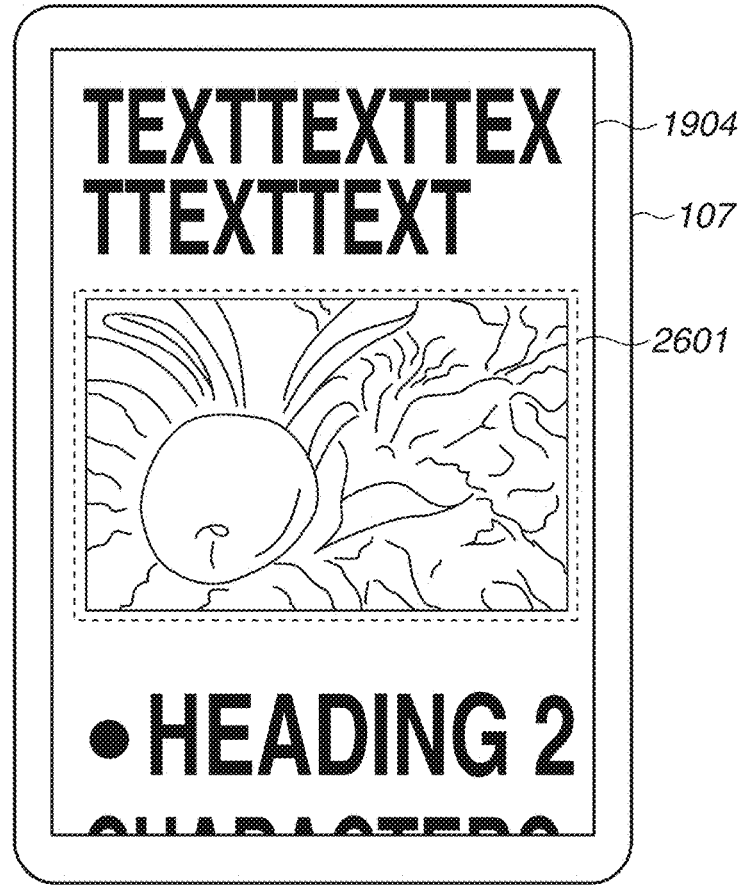

Next, mode switch processing performed by the display change event processing unit 2400 is described with reference to FIGS. 23, 25, 26A, and 26B. FIG. 25 is a flowchart illustrating the mode switch processing. FIGS. 26A and 26B are examples of a screen display on the touch UI 1904 of the mobile information terminal 107 according to the present exemplary embodiment.

First, in step S2500, the display change event processing unit 2400 obtains a display mode currently set to the mobile information terminal 107 when the screen is single tapped and the mode switch processing is executed. Then, if the display mode currently set to the mobile information terminal 107 when the mode switch processing is executed by the single-tap event is a partial area display mode (PARTIAL AREA in step S2500), the display change event processing unit 2400 advances the processing to step S2501 and switches the current display mode to the page display mode. Whereas if the display mode currently set is the page display mode (PAGE in step S2500), the processing is terminated.

The display mode described here means a method for displaying application image data on the touch UI 1904 by the mobile information terminal 107, and the mobile information terminal 107 according to the present exemplary embodiment has two display modes. First one is the "page display mode" suitable for displaying an entire page as shown in FIG. 23. Second one is the "partial area display mode" suitable for displaying a partial area in a page (namely, each object in the page) with enlargement as shown in FIG. 26B. An object that a user mainly browses in the partial area display mode (an object displayed on the center of the screen with enlargement) is referred to as a main object. According to the present exemplary embodiment, the page display mode is set immediately after the mobile information terminal 107 received the application image data. As shown in FIG. 26B, the partial area display mode is a display mode in which at least one of the objects in the page 2300 is recognized as a main object. FIG. 26B illustrates a screen which is displayed when an object 2601 is read as a main object. Broken lines surrounding objects in FIGS. 26A and 26B are drawn for facilitating understanding and are not actually provided on the page 2300.

In step S2501, the display change event processing unit 2400 changes the display mode to the page display mode. In step S2502, the display change event processing unit 2400 controls the display magnification so as to fit a width of the page 2300 as a display target into the width of the touch UI 1904 and controls the start point of the page 2300 to determine the display range of the page. Next, in step S2503, the display change event processing unit 2400 updates the display state of the touch UI 1904 based on the determined display range of the page.

Figure 10:
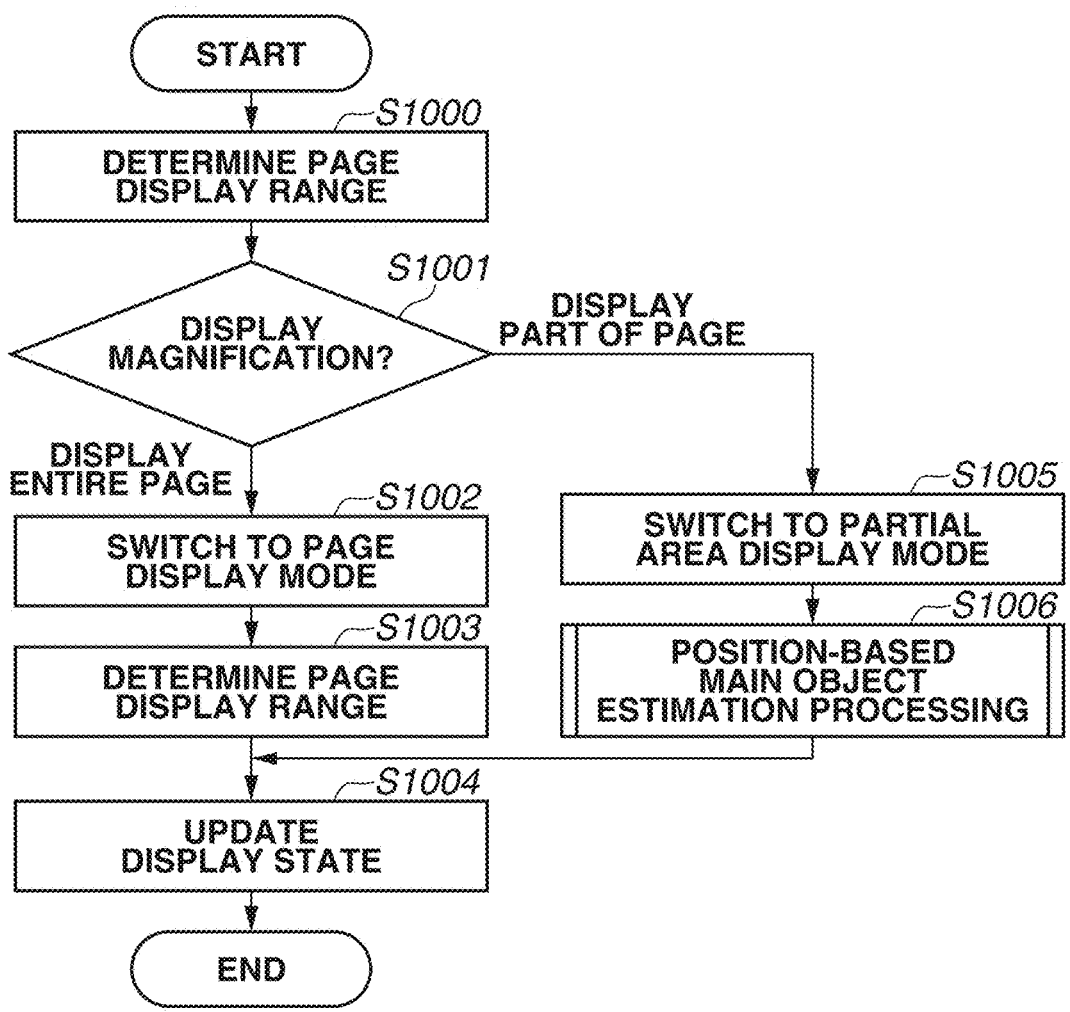
FIG. 10 is a flowchart illustrating page magnification change processing described according to the first exemplary embodiment.

FIG. 10 is a flowchart illustrating page magnification change processing performed by the enlargement and reduction event processing unit 2405.

In step S1000, the enlargement and reduction event processing unit 2405 changes the start point and the enlargement ratio of the page 2300 according to the reduction ratio of the received pinch-in event or the enlargement ratio of the received pinch-out event. Next, in step S1001, the enlargement and reduction event processing unit 2405 determines whether the display magnification of the page 2300 changed in step S1000 is a magnification at which the page 2300 can be entirely displayed on the touch UI 1904. If it is determined that the display magnification is to display the entire page 2300 on the touch UI 1904 (DISPLAY ENTIRE PAGE in step S1001), the processing proceeds to step S1002, and the display mode is switched to the page display mode.

In step S1003, the enlargement and reduction event processing unit 2405 controls the display magnification so that the width of the page 2300 fits into the width of the touch UI 1904 (or the height of the page 2300 fits into the height of the touch UI 1904). If the width and the height of the page are smaller than the touch UI 1904 when the page is reduced at the display magnification at which the entire page is displayed, the start point of the page 2300 on the coordinates of the touch UI 1904 is controlled so that the page is displayed on the center of the touch UI 1904. In other words, if the page 2300 is likely to be reduced to a magnification at which the page is displayed smaller than the screen of the touch UI 1904 by the pinch-in event, in step S1003, the start point and the display magnification of the page are controlled so that at least either of the width or the height of the page 2300 fits into the width or the height of the touch UI 1904 and the entire page is displayed. Then, in step S1004, the display state of the touch UI 1904 is updated, and the processing is terminated.

On the other hand, in step S1001, if it is determined that the display magnification is to display a part of the page 2300 on the touch UI 1904 with enlargement (DISPLAY PART OF PAGE in step S1001), the processing proceeds to step S1005, and the display mode is switched to the partial area display mode. In step S1006, the main object estimation processing unit 2404 performs "position-based main object estimation processing" described below to estimate a main object to be displayed next and reads the estimated main object as a next main object. Then, in step S1004, the display state of the touch UI 1904 is updated, and the processing is terminated.

Figure 11:
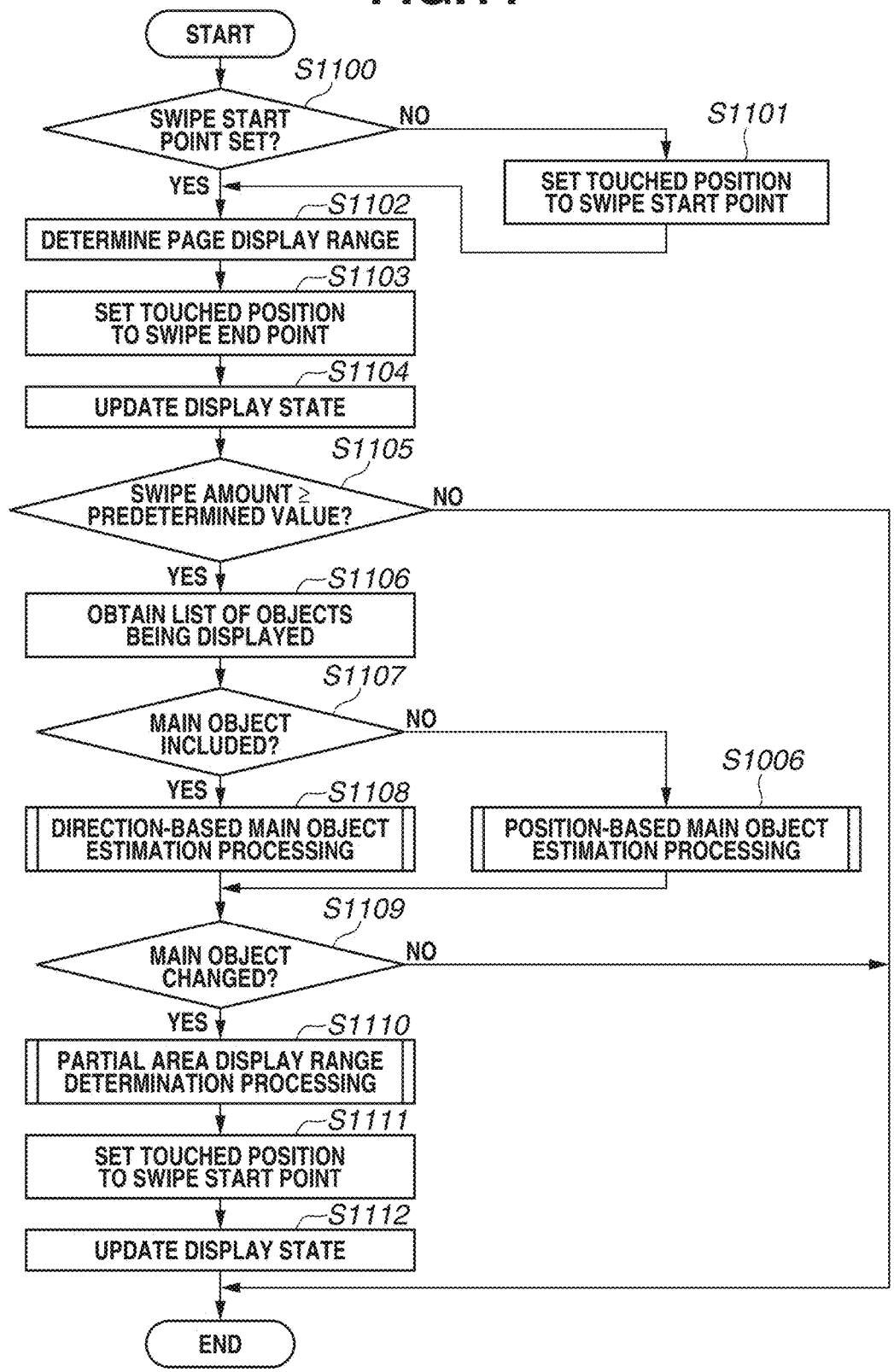
FIG. 11 is a flowchart illustrating page movement processing described according to the first exemplary embodiment.

FIG. 11 is a flowchart illustrating page movement processing performed by the swipe event processing unit 2401. The processing is performed in the partial area display mode.

In step S1100, the swipe event processing unit 2401 determines whether a swipe start point is set. If the swipe start point is set (YES in step S1100), the processing proceeds to step S1102, and whereas if not (NO in step S1100), the processing proceeds to step S1101. In step S1101, the swipe event processing unit 2401 calculates a first touched coordinate of a swipe operation on the touch UI 1904 from the latest touched coordinate and a moving distance of the swipe event and sets the first touched coordinate to the swipe start point. In this regard, a swipe start point is a coordinate regarded as a start point of a swipe operation made by a user. When the swipe event processing unit 2401 receives a swipe event for the first time, the swipe start point is in an unset state, thus, a first touched coordinate on the touch UI 1904 is set as the swipe start point at the time of a first swipe operation. According to the present exemplary embodiment, swipe operations can be performed continuously in such a manner that a swipe operation for moving a finger to one direction is performed and then a swipe operation for moving the finger to a next direction is performed while keeping the finger touched on the touch UI 1904. It is described in detail below, but when swipe operations are continuously performed, a first swipe end point is set as a next swipe start point.

In step S1102, the swipe event processing unit 2401 performs control to move a page start point (a display position) of the page 2300 according to the moving distance of the swipe event and determines a page display range displayed on the screen after the movement. In step S1103, the swipe event processing unit 2401 sets the latest touched coordinate of the swipe event to a swipe end point. In this regard, a swipe end point is a touched coordinate indicating an end point of one swipe operation. In step S1104, the swipe event processing unit 2401 updates the display state of the touch UI 1904 based on the page display range determined in step S1102.

In step S1105, the swipe event processing unit 2401 calculates a swipe amount of the swipe operation based on the swipe start point and the swipe end point and determines whether the swipe amount is equal to or greater than a predetermined value. The swipe amount can be calculated from a distance between the swipe start point and the swipe end point. If it is determined that the swipe amount is equal to or greater than the predetermined value (YES in step S1105), the processing proceeds to step S1106, and whereas if the swipe amount is less than the predetermined value (NO in step S1105), the processing is terminated. Accordingly, the swipe event processing unit 2401 can distinguish a swipe operation like slightly stirring a finger from a swipe operation that a user explicitly moves his/her finger and executes two different types of main object estimation processing which are described below only when the latter swipe operation is performed.

In step S1106, the swipe event processing unit 2401 obtains a list of objects which are being displayed now on the display and included in the page display range (the display range after moved by the swipe operation) determined in step S1102. The list of objects being displayed is a list of objects at least a part of which is being displayed in the screen of the touch UI 1904 in the partial area display mode.

In step S1107, the swipe event processing unit 2401 determines whether a main object is included in the list of objects being displayed. If it is determined that the main object is included in the list (YES in step S1108), the processing proceeds to step S1108, and below-described "direction-based main object estimation processing" is executed. Whereas if it is determined that the main object is not included in the list (NO in step S1108), the processing proceeds to step S1006, and the "position-based main object estimation processing" is executed (the processing in step S1006 in FIG. 11 is similar to the processing in step S1006 in FIG. 10).

A swipe event is generated by the gesture event generation unit 2001 according to timer interruption as described above. A moving distance of a swipe event is basically dependent on a speed and a size of a swipe operation made by a user, and when a user moves his/her finger quickly and broadly, the moving distance becomes large. A situation in which a main object is not included in the list of objects being displayed is that the main object displayed on the touch UI 1904 before the swipe operation moves out of the screen because the moving distance is large, and the main object is not displayed on the touch UI 1904.

In step S1109, the swipe event processing unit 2401 determines whether the main object is changed in the processing in step S1108 or in step S1006. If the main object is changed (YES in step S1109), the processing proceeds to step S1110. Whereas if the main object is not changed (NO in step S1109), the processing is terminated.

In step S1110, the display change event processing unit 2400 performs partial area display range determination processing, which is described below, and determines the display range of the page 2300 according to a start point, a width, a height, and an attribute of the main object. Then, in step S1111, the swipe event processing unit 2401 sets the latest touched coordinate of the swipe event to the swipe start point. In step S1112, the display change event processing unit 2400 updates the display state of the touch UI 1904 based on the display range determined in step S1110. The start points of the continuous swipe operations until then are initialized by the processing in step S1111, thus a next swipe operation can be recognized which is performed after the main object is changed and the display on the touch UI 1904 is updated while touching the screen with the finger.

Figure 27:
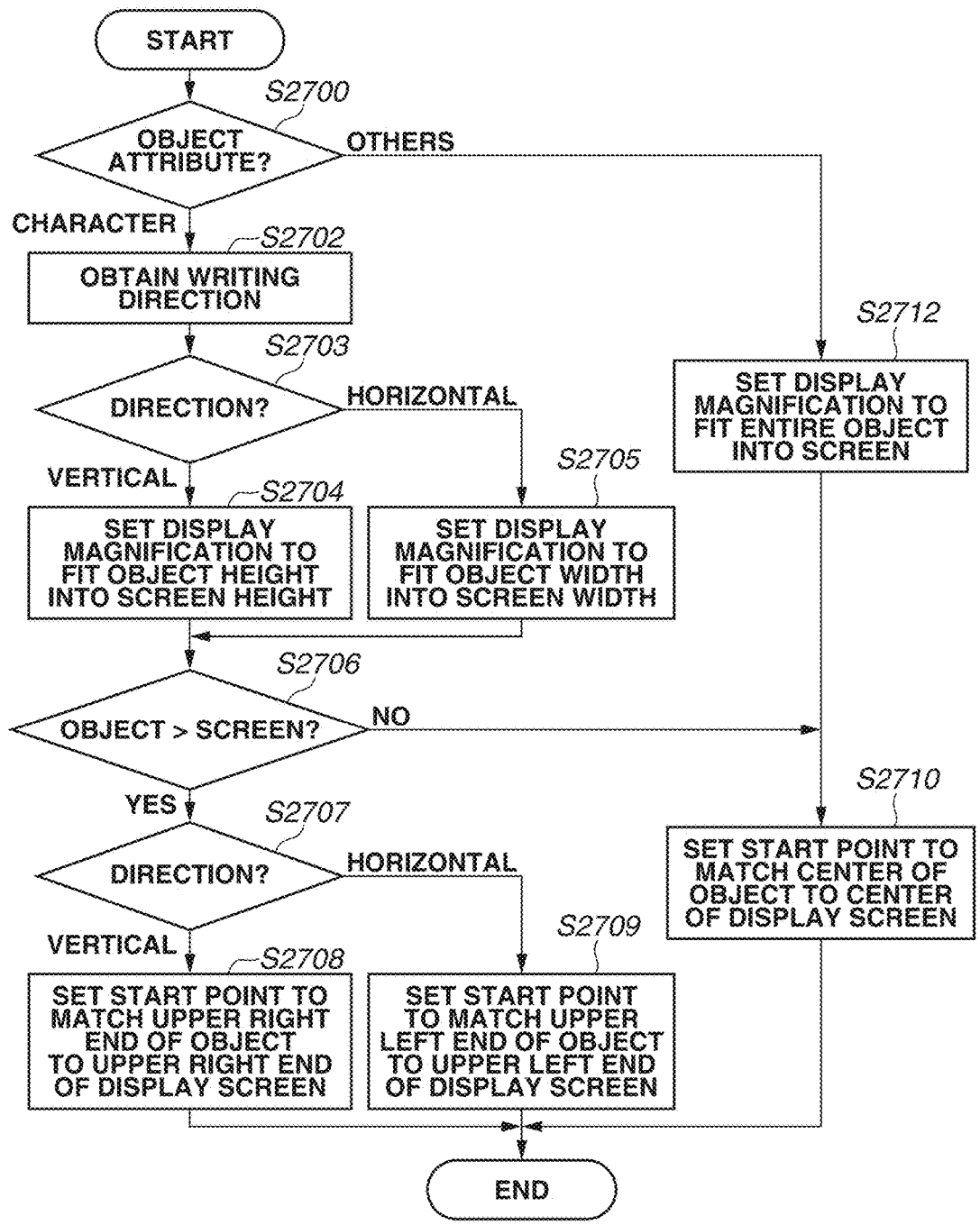
FIG. 27 is a flowchart illustrating partial area display range determination processing described according to the first exemplary embodiment.

Next, the partial area display range determination processing in step S1110 are described in detail below with reference to a flowchart illustrated in FIG. 27.

First, in step S2700, the display range control unit 2403 reads an object set as a main object and determines an attribute of the read object. If the attribute is a character (CHARACTER in step S2700), the processing proceeds to step S2702, and whereas if the attribute is the others (OTHERS in step S2700), the processing proceeds to step S2712. In step S2702, the display range control unit 2403 obtains a writing direction of characters in the object. The writing direction of the object is obtained in the process of the OCR processing in step S304. In step S2703, the display range control unit 2403 determines the writing direction of characters. If the writing direction is the vertical writing (VERTICAL in step S2703), the processing proceeds to step S2704, and whereas if the writing direction is the horizontal writing (HORIZONTAL in step S2703), the processing proceeds to step S2705. When the writing direction of characters is the vertical writing, in step S2704, the display range control unit 2403 sets the display magnification of the page so as to fit a height of the object into the height of the touch UI 1904. Further, when the writing direction of characters is the horizontal writing, in step S2705, the display range control unit 2403 sets the display magnification of the page so as to fit a width of the object into the width of the touch UI 1904.

Next, in step S2706, the display range control unit 2403 determines whether the object enlarged or reduced at the display magnification set in step S2704 or in step S2705 can be entirely displayed on the touch UI 1904. If the entire object is larger than the touch UI 1904 and cannot be displayed thereon (YES in step S2706), the processing proceeds to step S2707, and whereas if the entire object is smaller than the touch UI 1904 and can be displayed thereon (NO in step S2706), the processing proceeds to step S2710. In step S2707, the display range control unit 2403 determines the writing direction of characters in the object. If it is determined as the vertical writing (VERTICAL in step S2707), the processing proceeds to step S2708, and whereas if it is determined as the horizontal writing (HORIZONTAL in step S2707), the processing proceeds to step S2709.

In step S2708, since the display range control unit 2403 displays a character area of the vertical writing the entire object of which cannot be displayed on the touch UI 1904, the display range control unit 2403 sets a position of the start point of the page 2300 so as to match an upper right end of the object to an upper right end of the touch UI 1904. In other words, the display range is set to display a first line in the vertical writing. In step S2709, since the display range control unit 2403 displays a character area of the horizontal writing the entire object of which cannot be displayed on the touch UI 1904, the display range control unit 2403 sets a position of the start point of the page 2300 so as to match an upper left end of the object to an upper left end of the touch UI 1904. In other words, the display range is set to display a first line in the horizontal writing.

In step S2710, since the entire main object as the display target fits into the screen of the touch UI 1904, the display range control unit 2403 sets the start point of the page 2300 so as to match the center of the object to the center of the touch UI 1904.

In step S2700, if the attribute of the object is determined as other attribute (the attribute other than the character), then in step S2712, the display range control unit 2403 sets the display magnification of the page so as to fit the entire object into the touch UI 1904. Then, in step S2710, the display range control unit 2403 sets the start point of the page 2300 so as to match the center of the object to the center of the touch UI 1904.

Figure 31:
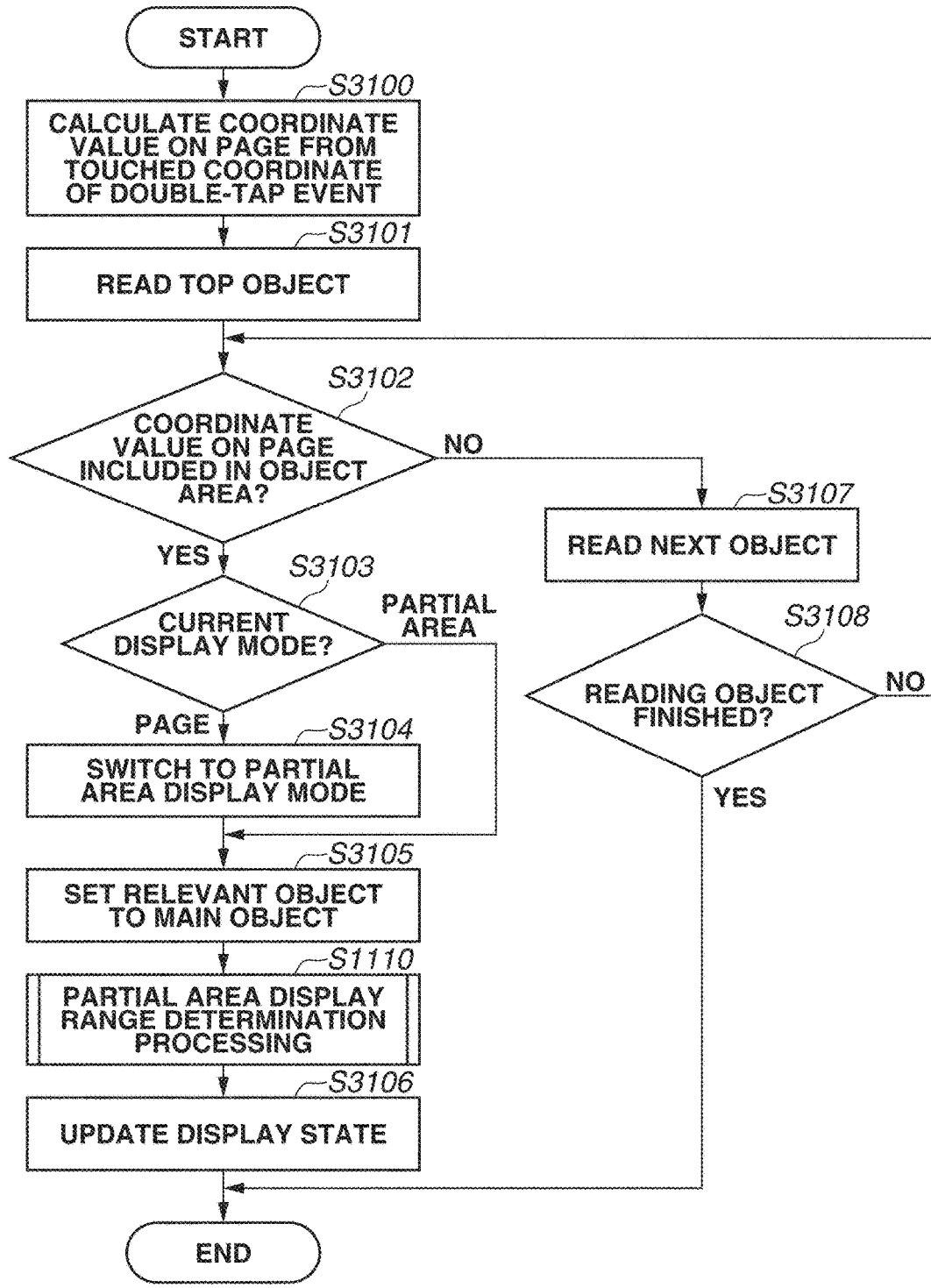
FIG. 31 is a flowchart illustrating object selection processing described according to the first exemplary embodiment.

Next, object selection processing performed by the object selection processing unit 2408 when a double-tap operation is performed is described with reference to a flowchart illustrated in FIG. 31.

First, in step S3100, the object selection processing unit 2408 obtains a coordinate value of a touched coordinate of a received double-tap event. The coordinate value of the touched coordinate is a coordinate value on the touch UI 1904, thus the object selection processing unit 2408 converts the obtained coordinate value into a coordinate value on the page based on the display magnification and a start point of the page displayed on the touch UI 1904. In step S3101, the object selection processing unit 2408 reads information of a top object from among all objects in the page currently displayed on the touch UI 1904. In step S3102, the object selection processing unit 2408 determines whether the coordinate value on the page obtained in step S3100 is included in area information of the read object. If the coordinate value on the page is included in the area information of the object (YES in step S3102), the processing proceeds to step S3103, and whereas if not (NO in step S31012), the processing proceeds to step S3107.

In step S3103, the object selection processing unit 2408 obtains the display mode set to the mobile information terminal 107 when a user performs the operation. If the obtained display mode is the page display mode (PAGE in step S3103), the processing proceeds to step S3104, and whereas if the display mode is the partial area display mode (PARTIAL AREA in step S3103), the processing proceeds to step S3105. In step S3104, the object selection processing unit 2408 switches the display mode of the mobile information terminal 107 from the page display mode to the partial area display mode.

In step S3105, the object selection processing unit 2408 sets the double-tapped object (namely the object read in step S3101 or in step S3107) as a main object. Then, in step S1110, the display range control unit 2403 performs the partial area display range determination processing based on the object set as the main object in step S3104. The partial area display range determination processing is described above, so that the detail descriptions thereof are omitted here, however, the display range is determined so that the main object is displayed. Then, in step S3106, the display change event processing unit 2400 updates the display state of the touch UI 1904 according to the display magnification and the start point of the page determined by the partial area display range determination processing.

On the other hand, in step S3107, the object selection processing unit 2408 reads information of an object next to the currently read object from among all objects in the page currently displayed. In step S3108, the object selection processing unit 2408 determines whether a next object has been read in step S3107. If the object has been read (NO in step S3108), the processing returns to step S3102, and whereas if the object has not been read (in other words, in the case where a part other than the object, like a margin, is double-tapped), the processing is terminated with doing nothing.

According to the present exemplary embodiment, determination of whether the coordinate value on the page is included in the area information of the object is performed for all objects in the page currently displayed on the touch UI 1904, however, it is not limited to them. The determination can be performed by selecting only objects having a specific attribute, for example, only objects having a character attribute, or selecting objects by excluding only a specific attribute.

Figure 12:
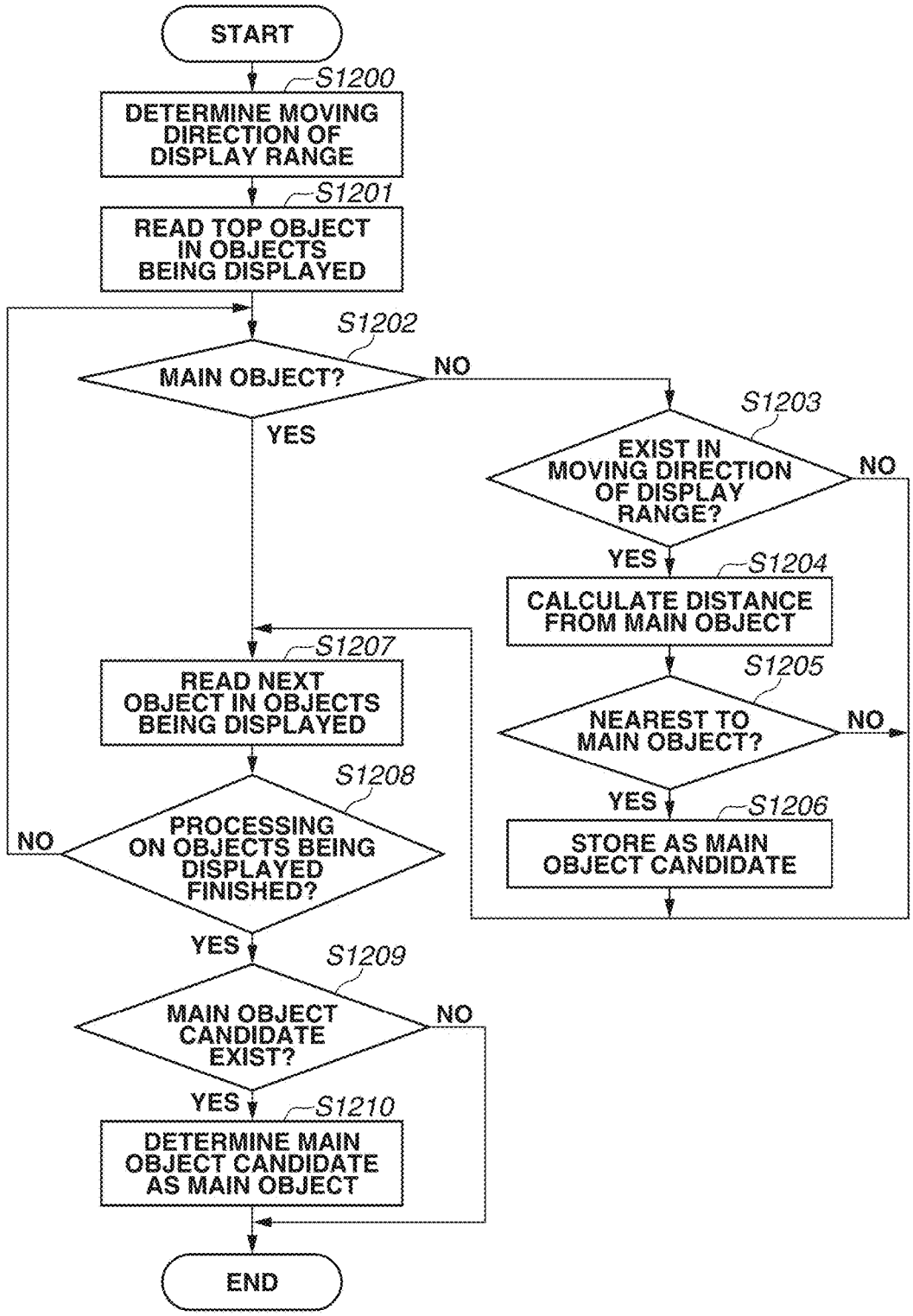
FIG. 12 is a flowchart illustrating direction-based main object estimation processing described according to the first exemplary embodiment.

Next, "direction-based main object estimation processing" performed by the main object estimation processing unit 2404 is described with reference to FIGS. 12, 26A, 26B, and 29A to 29E. FIG. 12 is a flowchart illustrating the details of the direction-based main object estimation processing. FIGS. 29A to 29E are examples of a screen display on the touch UI 1904 of the mobile information terminal 107 according to the present exemplary embodiment.

In step S1200, the display range moving direction determination processing unit 2402 in the main object estimation processing unit 2404 determines a direction to which the display range of the page 2300 is moved by the swipe operation (a display range moving direction). The display range moving direction can be calculated based on the swipe start point set in step S1101 or in step S1111 and the swipe end point set in step S1103 in the above-described page movement processing. FIG. 29A indicates a state immediately before a user performs a swipe operation by touching a position of a touched coordinate 2900 (a swipe start point) with his/her finger in a state in which the object 2601 is displayed as a main object as shown in FIG. 26B. FIG. 29B indicates a state in which the user's finger is moved from the touched coordinate 2900 to a touched coordinate 2901 (a swipe end point) from the state in FIG. 29A by the swipe operation made by the user and the swipe event processing unit 2401 receives a swipe event. FIG. 29C indicates a state in which an object 2602 is set as a new main object by the "direction-based main object estimation processing" when the swipe operation is performed as shown in FIG. 29B and the display range of the page 2300 is moved by the processing in step S1110 and in step S1112 of the page movement processing. FIG. 29D indicates a state in which the user's finger is moved from the touched coordinate 2901 (a new swipe start point) to a touched coordinate 2902 (a new swipe end point) from the state in FIG. 29C by the swipe operation made by the user and the swipe event processing unit 2401 receives a swipe event. FIG. 29E indicates a state in which an object 2604 is set as a new main object by the "direction-based main object estimation processing" when the swipe operation is performed as shown in FIG. 29D and the display range of the page 2300 is moved by the processing in step S1110 and in step S1112 of the page movement processing. In the examples indicated in FIGS. 29A to 29E, the user does not separate his/her finger from the touch UI 1904 during the operation from FIG. 29A to FIG. 29E, and a touch release event is not generated in the meanwhile. When the state is as shown in FIG. 29B, the touched coordinate 2900 is set as the swipe start point in step S1101 and the touched coordinate 2901 is set as the swipe end point in step S1103 of the page movement processing. Thus, it is regarded as that the swipe operation is performed to a left direction with respect to the touch UI 1904 from the touched coordinate 2900 to the touched coordinate 2901. Accordingly the display range of the page 2300 is moved to a right direction, and the display range moving direction becomes the right direction. In other words, the display range moving direction is 180-degree opposite to the direction that the touched coordinates are moved on the touch UI 1904 by the continuous swipe operations. According to the present exemplary embodiment, the display range moving direction can be classified into any one of eight directions including four oblique directions of upper right, lower right, upper left, and lower left in addition to four directions of upward, downward, right, and left. The direction can be obtained by determining which of the eight directions arranged at intervals of 45 degrees an angle of a line segment BA between the touched coordinate 2900 as a point A and the touched coordinate 2901 as a point B is close to. Further, when the state is as shown in FIG. 29C, the touched coordinate 2901 is set as a new swipe start point in step S1111, and when the state is as shown in FIG. 29D, the touched coordinate 2902 is set as a new swipe end point in step S1103. The swipe operation at this point is performed from the touched coordinate 2901 to the touched coordinate 2902, namely to the lower right direction with respect to the touch UI 1904. However, the display range of the page 2300 is moved to the upper left direction, thus the display range moving direction is regarded as the upper left direction. As described above, the display range moving direction is determined based on the swipe operation in step S1200.

In step S1201, the main object estimation processing unit 2404 reads the top object from the list of objects being displayed. In step S1202, the main object estimation processing unit 2404 determines whether the read object is the main object or not. If the read object is the main object (YES in step S1202), the processing proceeds in step S1207, and whereas if not (NO in step S1202), the processing proceeds to step S1203.

In step S1203, the main object estimation processing unit 2404 determines whether the read object which is being displayed exists in the display range moving direction with respect to the main object. If, the read object is in the display range moving direction (YES in step S1203), the processing proceeds to step S1204, and whereas if not (NO in step S1203), the processing proceeds to step S1207. In the state illustrated in FIG. 29B, the main object is the object 2601, and the display range moving direction determined in step S1200 is the right direction. Further, in the state illustrated in FIG. 29D, the main object is the object 2602, and the display range moving direction is the upper left direction.

According to the present exemplary embodiment, the determination of whether the object being displayed is in the display range moving direction with respect to the main object is performed by differentiating conditions for two directions of the upward and downward directions, two directions of the right and left directions, and four directions of oblique directions. In the case that the display range moving direction is in the vertical direction (upward or downward direction), when the object being displayed is on the outside of a side (an upper side or a lower side) of the main object in the display range moving direction and an x-coordinate of the upper or the lower side of the main object is at least partly overlapped with an x-coordinate of the upper or the lower side of the object being displayed, the object being displayed is determined as in the display range moving direction. In the case that the display range moving direction is in the right or the left direction, when the object being displayed is on the outside of a side (a left side or a right side) of the main object in the display range moving direction and a y-coordinate of the left or the right side of the main object is at least partly overlapped with a y-coordinate of the left or the right side of the object being displayed, the object being displayed is determined as in the display range moving direction. Further, in the case that the display range moving direction is in any one of the four oblique directions, when coordinates of four corners of the object being displayed are within ranges of 45 degrees centered on the display range moving direction from a center point of the main object, the object being displayed is determined as in the display range moving direction.

In the case that the display range moving direction is in any one of the four oblique directions, the determination method is not limited to the above-described one. The object being displayed which is in the oblique display range moving direction may be determined from among the objects being displayed x-coordinates of the upper or the lower side of which are not overlapped with the x-coordinate of the upper or the lower side of the main object and y-coordinates of the left or the right side of which are not overlapped with the y-coordinate of the left or the right side of the main object. For example, in the case that the display range moving direction is the upper left direction, if the x-coordinate of the upper or the lower side of the object being displayed is on a left side of the x-coordinate of the upper or the lower side of the main object and the y-coordinate of the left or the right side of the object being displayed is on an upper side of the y-coordinate of the left or the right side of the main object, the object being displayed is determined as in the upper left direction of the main object.

In FIG. 29B, the objects being displayed in the right direction from the main object 2601 in the display range moving direction are the objects 2602 and 2603. Further, in FIG. 29D, the object being displayed in the upper left direction from the main object 2602 in the display range moving direction is the object 2604.

In step S1204, the main object estimation processing unit 2404 calculates a distance from the main object if the read object being displayed is in the display range moving direction of the main object. According to the present exemplary embodiment, when a distance from the main object is calculated, different calculation methods are used for the four directions of upward, downward, right, and left directions, and for the four oblique directions. In the case of the upward, downward, right, and left directions, a distance between the nearest side among four sides of the main object and four sides of the object being displayed is regarded as the distance from the main object. In the case of the four oblique directions, a distance between the center coordinate of the main object and a coordinate nearest to the center coordinate of the main object among coordinates of four corners of the object being displayed is regarded as the distance from the main object.

In step S1205, the main object estimation processing unit 2404 determines whether the relevant object being displayed is nearest to the main object among the objects being displayed in the display range moving direction of the main object. If it is determined that the relevant determination target object being displayed is nearest to the main object (YES in step S1205), the processing proceeds to step S1206, and whereas if not (NO in step S1205), the processing proceeds to step S1207. In step S1206, the main object estimation processing unit 2404 stores the object being displayed which is nearest to the main object as a main object candidate to be a next main object. In step S1207, the main object estimation processing unit 2404 reads a next object being displayed from the list of objects being displayed. Next, in step S1208, if there is the object being displayed to be read in step S1207 (NO in step S1208), the main object estimation processing unit 2404 returns the processing to step S1202, and whereas if there is no object being displayed to be read (YES in step S1208), the processing proceeds to step S1209.

In step S1209, the main object estimation processing unit 2404 determines whether the main object candidate is included in the list of objects being displayed. If the main object candidate is included (YES in step S1209), the processing proceeds to step S1210, and whereas if not (NO in step S1209), the processing is terminated. In step S1210, the main object estimation processing unit 2404 sets the main object candidate as the main object.

In FIG. 29B, between the objects 2602 and 2603 being displayed in the display range moving direction, the object being displayed nearest to the main object 2601 is the object 2602. Further, in FIG. 29D, the object being displayed in the display range moving direction is only the object 2604, thus the object being displayed nearest to the main object 2601 is the object 2604. Accordingly, the object 2602 is set as the main object in FIG. 29C, and the above-described page movement processing is performed to move the display range of the page 2300 to a range convenient for browsing the object 2602. Further, in FIG. 29E, the object 2604 is set as the main object, and the display range of the page 2300 is moved to a range convenient for browsing the object 2604.

In the direction-based main object estimation processing according to the present exemplary embodiment, the main object candidate is described as the one of which distance from the main object is the nearest among the objects being displayed in the display range moving direction, however, the main object candidate is not limited to that. For example, the main object candidate may be read from the list of objects being displayed by targeting on only objects having the same attribute as the main object. Further, a priority order may be set to object attributes, and when objects are read from the list of objects being displayed, the objects are read in the order of, for example, characters, graphics, and photographs, and an object being displayed which is in the nearest distance from the main object in the same attribute may be preferentially regarded as the main object candidate. Furthermore, a priority order may be further set to the object attributes of a plurality of objects being displayed which are within a predetermined distance from the main object among the read objects being displayed, and an object having a higher priority order may be regarded as the main object candidate. In addition, the main object candidate may be estimated not only from a distance of the read object being displayed from the main object but also, for example, a combination of the distance and an area of the object displayed on the touch UI 1904. Further, when a plurality of objects being displayed exists on an extension line of a line segment BA between a swipe start point as a point A and a swipe end point as a point B, an object being displayed nearest to the swipe end point B may be set as a next main object.

Figure 28:
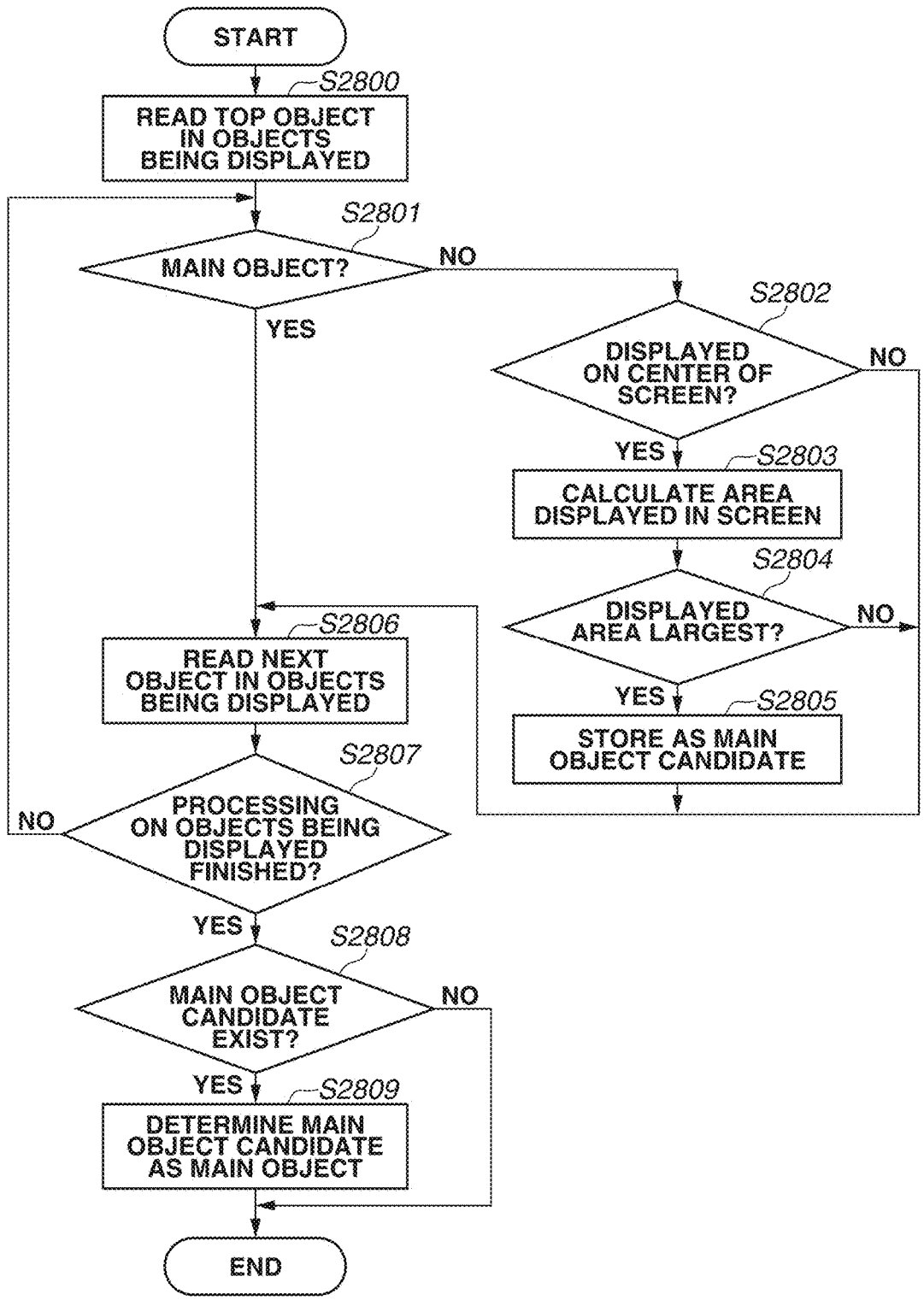
FIG. 28 is a flowchart illustrating position-based main object estimation processing described according to the first exemplary embodiment.
Figure 30A:
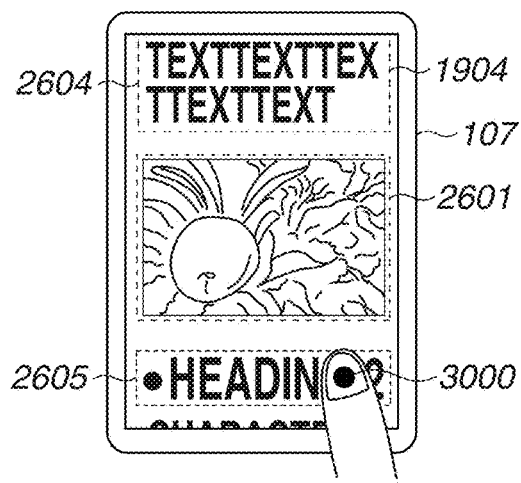
FIGS. 30A, 30B, and 30C are examples of screen display of a touch UI on a mobile information terminal.
Figure 30B:
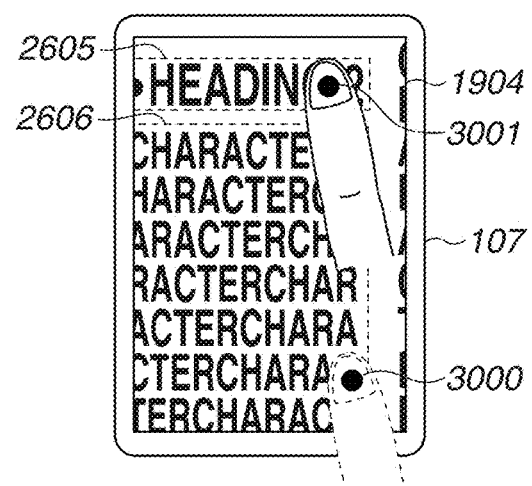
Figure 30C:
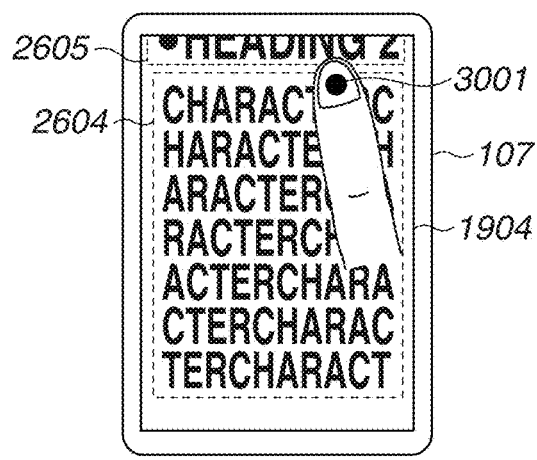

Next, "position-based main object estimation processing" performed by the main object estimation processing unit 2404 is described with reference to FIGS. 26A, 26B, 28, and 30A to 30C. FIG. 28 is a flowchart illustrating details of the "position-based main object estimation processing". FIGS. 30A to 30C are examples of a screen display on the touch UI 1904 of the mobile information terminal 107 according to the present exemplary embodiment.

In step S2800, the main object estimation processing unit 2404 reads the top object from the list of objects being displayed. In step S2801, the main object estimation processing unit 2404 determines whether the read object is the main object. If the read object is the main object (YES in step S2801), the processing proceeds to step S2806, and whereas if not (NO in step S2801), the processing proceeds to step S2802.

In step S2802, the main object estimation processing unit 2404 determines whether the read object being displayed is displayed on a position including the center of the screen of the touch UI 1904. If it is in the center of the screen (YES in step S2802), the processing proceeds to step S2803, and whereas if it is not in the center thereof (NO in step S2802), the processing proceeds to step S2806. In this regard, the center of the screen is an area having a predetermined small size including a center point of the screen, and in step S2802, it is determined whether the object being displayed includes at least a part of the small area defined in the center of the screen. FIG. 30A indicates a state in which the object 2601 is displayed as the main object in FIG. 26B and a user touches a position of a touched coordinate 3000 with his/her finger, and it is just about to start a swipe operation. FIG. 30B indicates a state in which the user quickly made a large swipe operation in the upward direction from the state in FIG. 30A and the user's finger moved from the touched coordinate 3000 to a touched coordinate 3001. FIG. 30B is also a state immediately after the swipe event processing unit 2401 receives a swipe event. Since the large swipe operation is made, the main object 2601 is moved outside of the display screen and not displayed. The display range moving direction at this time is the downward direction, and the object being displayed nearest to the main object 2601 is the object 2605 between the objects being displayed 2605 and 2606 in the display range moving direction (the downward direction). On the other hand, the object 2606 is the object being displayed which is displayed on a position including the center of the screen of the touch UI 1904.

In step S2803, the main object estimation processing unit 2404 calculates an area displayed on the touch UI 1904 of the read object being displayed. Calculation of the displayed area can be performed by calculating an area of an overlapping range between the display range of the page 2300 and an area of the object being displayed. Next, in step S2804, the main object estimation processing unit 2404 determines whether the read object being displayed is displayed at the largest on the screen among the objects being displayed which are displayed at the position including the small area at the center of the screen of the touch UI 1904 based on the area calculated in step S2803. If the display area of the read object being displayed is determined as the largest (YES in step S2804), the processing proceeds to step S2805, and whereas if not (NO in step S2804), the processing proceeds to step S2806. In step S2805, the main object estimation processing unit 2404 updates a next main object candidate with the object being displayed of which displayed area on the screen is the largest and stores it in the memory. In FIG. 30B, the object being displayed which is displayed on the position including the center of the screen of the touch UI 1904 is only the object 2606, and thus the object 2606 is the object being displayed of which displayed area on the screen is the largest.

In step S2806, the main object estimation processing unit 2404 reads a next object being displayed from the list of objects being displayed. In step S2807, if there is a next object being displayed to be read in step S2806 (NO in step S2807), the main object estimation processing unit 2404 returns the processing to step S2801, and whereas if there is no next object being displayed to be read (namely, the processing is performed on all of the objects being displayed), the processing proceeds to step S2808.

In step S2808, the main object estimation processing unit 2404 determines whether the main object candidate is stored in the memory. If the main object candidate is stored in the memory (YES in step S2808), the processing proceeds to step S2809, and whereas if not (NO in step S2808), the processing is terminated. In step S2809, the main object estimation processing unit 2404 sets the main object candidate as a next main object. FIG. 30C indicates a state in which the object 2606 is set as the next main object as a result of performing the "position-based main object estimation processing" in the state in FIG. 30B, and the display range of the page 2300 is moved and updated by performing processing in step S1110 and in step S1112 of the page movement processing. As shown in FIG. 30C, the object 2606 set as the new main object is displayed on a position convenient for browsing.

In the "position-based main object estimation processing" according to the present exemplary embodiment, the main object candidate is described as the object which has the largest display area among the objects being displayed which are displayed in the position including the small area in the center of the screen. However, it is not limited to this.

For example, the main object candidate may be read from the list of objects being displayed by targeting on only objects having the same attribute as the main object. For example, if the first main object is in an area having the character attribute, the next main object is also in the area having the character attribute. In addition, the object having a higher priority may be set as the main object candidate among the objects being displayed by setting a priority order to attributes in order from that of the current main object to the others.

According to the present exemplary embodiment, a broken line surrounding each object in FIGS. 26A and 26B, 29A to 29E, and 30A to 30C are drawn for facilitating understanding and are not actually provided on the page 2300. However, the configuration is not limited to this. For example, an object surrounding may be highlighted by a broken line or a solid line for enabling a user to easily identify an area of a current main object, and also the main object candidate may be highlighted.

As described above, according to the present exemplary embodiment, when a structured document including a plurality of areas (i.e., a plurality of objects) is displayed in the partial area display mode, an area to be a next main object can be estimated and displayed based on a swipe operation performed by a user.

According to the first exemplary embodiment, it is described that the swipe event processing unit 2401 performs processing for estimating a next main object if a swipe amount is equal to or greater than a predetermined amount in page movement processing corresponding to a swipe event operation. Accordingly, when the main object is changed in the continuous swipe operations, the display range of the page can be moved so that the changed main object comes to a position easily browsed. On the other hand, when the swipe event processing unit 2401 receives a swipe event having a predetermined swipe amount or more, the display range of the page is immediately moved by estimating the next main object, therefore if a user unintentionally performs a large swipe operation in the middle of a conventional swipe operation, the next main object is displayed. Thus, according to a second exemplary embodiment, the above-described page movement processing is separated to "page movement processing following a conventional swipe operation" and "processing for estimating a next main object", an event timer is set in the former processing, and the latter processing is called as an event after a certain time length has elapsed.

Figure 32:
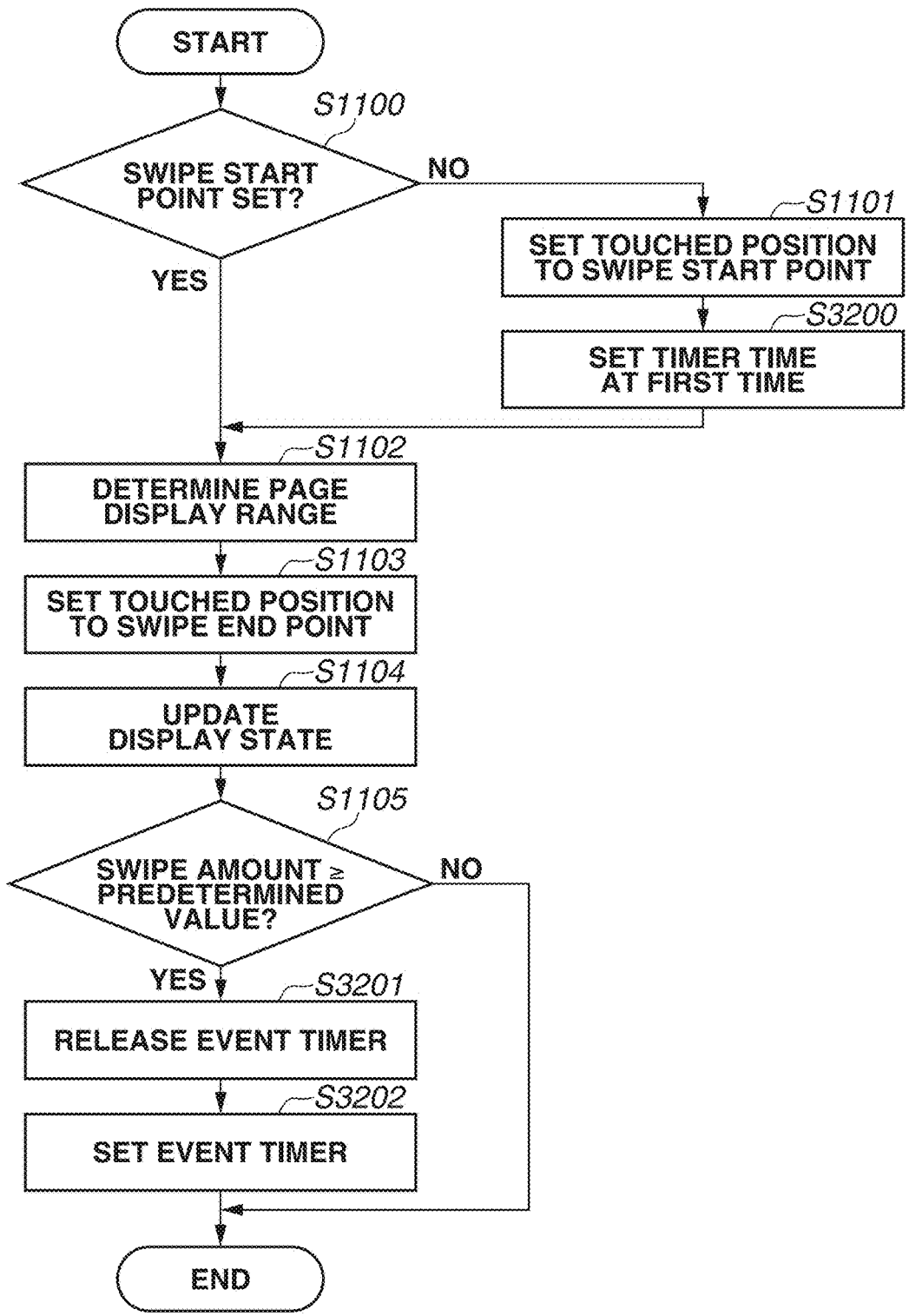
FIG. 32 is a flowchart illustrating page movement processing described according to a second exemplary embodiment.

The page movement processing performed by the swipe event processing unit 2401 according to the second exemplary embodiment is described with reference to FIG. 32 and FIG. 33. The same reference numerals are assigned to portions similar to those in the first exemplary embodiment and descriptions thereof are omitted, and portions different from the first exemplary embodiment are only described below. In FIG. 32, the processing is different from the page movement processing (FIG. 11) according to the first exemplary embodiment only in steps S3200, S3201, and S3202. Further, steps after step S1106 according to the first exemplary embodiment are executed in processing (FIG. 33) different from the page movement processing (FIG. 32).

First, in step S1100, if the swipe event processing unit 2401 determines that the swipe start point is not set (namely, it is the first swipe operation, NO in step S1100), in step S1101, the swipe event processing unit 2401 set a touched position to the swipe start point. Then, in step S3200, the swipe event processing unit 2401 set a first time period to a timer time of main object estimation processing described below. According to the present exemplary embodiment, the timer time of the main object estimation processing has two types of time, namely a first time period and a second time period, and the first time period is set longer than the second time period, for example, the first time period is set to 0.3 seconds, and the second time period is set to 0.01 seconds.

In step S3201, if it is determined in step S1105 that the swipe amount is equal to or greater than the predetermined value, and the event timer of the below-described main object estimation processing is already set, the swipe event processing unit 2401 releases the event timer and advances the processing to step S3202. Accordingly, an event for executing the below-described main object estimation processing after a certain time length is controlled not to occur overlappingly. Next, in step S3202, the swipe event processing unit 2401 sets a timer time set in step S3200 or in step S3300 described below to the event timer of the event for executing the below-described main object estimation processing after the certain time length has elapsed. The event timer is managed by the timer 1913 separately from a gesture event and transmits an event for causing the swipe event processing unit 2401 to execute the main object estimation processing after the timer time set to the event timer has elapsed to execute the main object estimation processing in FIG. 33.

Accordingly, when a user continuously performs the swipe operations, the event timer is reset every time the swipe amount becomes a predetermined value or more. Thus, only when a swiped finger is stopped longer than the timer time set to the event timer, the below-described main object estimation processing in FIG. 33 can be executed.

Next, the main object estimation processing performed by the swipe event processing unit 2401 according to the second exemplary embodiment is described with reference to FIG. 33. As described above, the main object estimation processing according to the second exemplary embodiment is obtained by separating steps after step S1106 from the page movement processing (FIG. 11) according to the first exemplary embodiment and adding step S3300 thereto.

Figure 33:
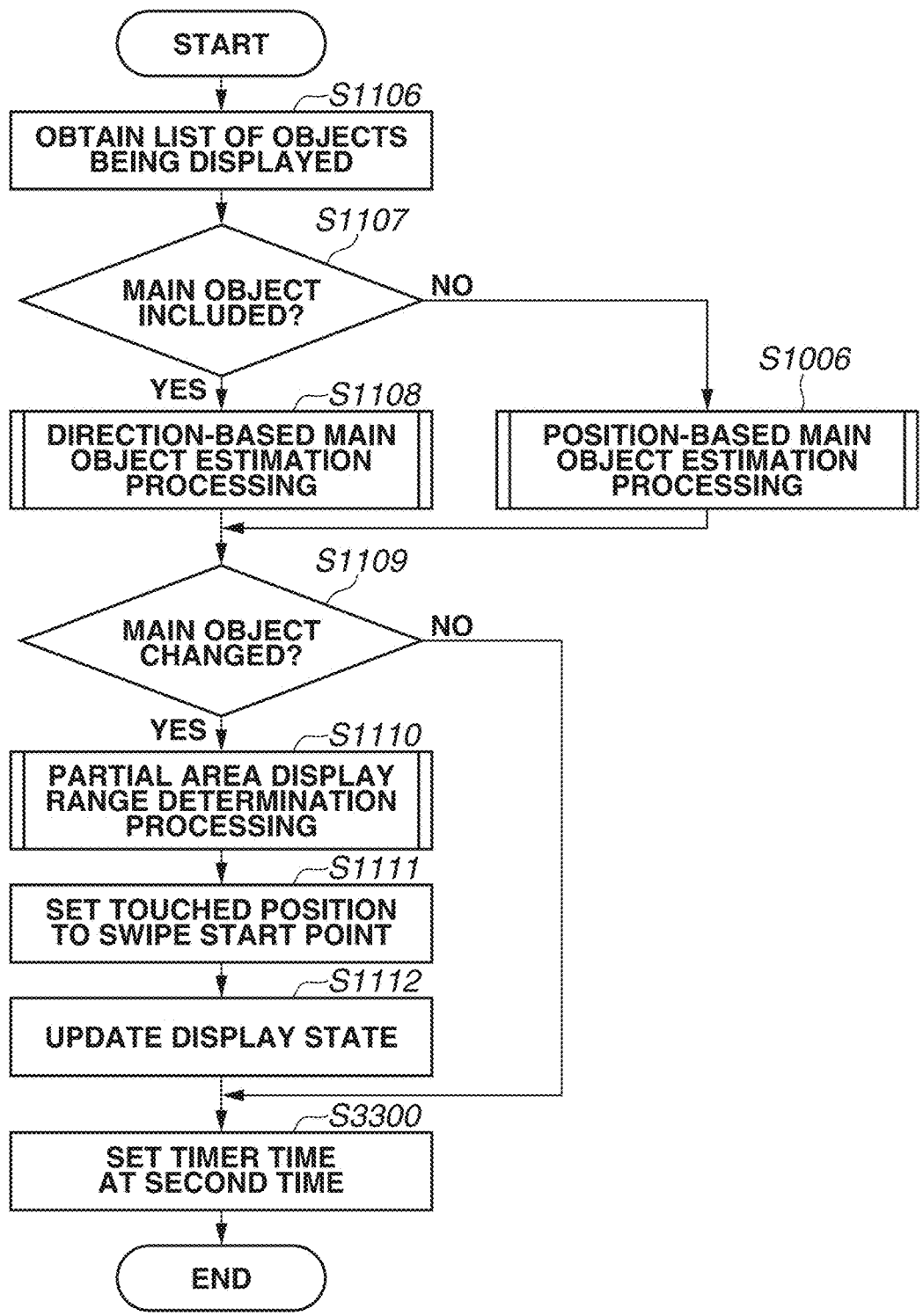
FIG. 33 is a flowchart illustrating main object estimation processing described according to the second exemplary embodiment.

When an "event for executing the main object estimation processing" which is transmitted when a swiped finger is stopped longer than the time set to the event timer is received, the swipe event processing unit 2401 executes the processing illustrated in FIG. 33. In the processing after step S1106 in FIG. 33, the next main object is estimated according to the object being displayed and the display range moving direction (in step S1108 or step S1006). Further, when the main object is changed, the display range of the page 2300 is moved according to area information and an attribute of the next main object in step S1110 and in step S1112 so that the estimated next main object can be easily browsed.

In step S3300, the swipe event processing unit 2401 sets the timer time to the second time period (for example 0.01 seconds), then the processing is terminated. Therefore, if a user continuously performs a next swipe operation without taking off his/her finger, the main object estimation processing is executed when the finger stops for the second time period (0.01 seconds) or more.

As described above, according to the second exemplary embodiment, if a user moves his/her finger when performing a swipe operation, the movement processing following a conventional swipe operation can be performed. In addition, when the user swipes his/her finger for a predetermined swipe amount or more in a first swipe operation and stops the finger for the first time period or more, the main object estimation processing is executed and the next main object is displayed on an easily viewable position. In the case where the swipe operations are continuously performed, in the second and later swipe operations, the main object estimation processing is executed when the finger stops for the second time period (the second time period is shorter than the first time period) or more, and the next main object is displayed on an easily viewable position. As described above, the display range is moved by estimating an area of the main object that the user views next only when the finger stops for a certain time length in the swipe operations, so that the processing can easily coexist with the movement following the conventional swipe operation. Further, in the case where the swipe operations are continuously performed, the event timer for transmitting an execution event of the main object estimation processing is set long (e.g. 0.3 seconds) in the first swipe operation and set short (e.g., 0.01 seconds) in the following second and later swipe operations. Therefore, in the case where the swipe operations are continuously performed by keeping the finger touched, the main object estimation processing can be performed without stopping the finger for the long time in the second and later swipe operations.

According to the first and the second exemplary embodiments, it is described that continuous swipe operations are detected from an entire area of the touch UI 1904, and the next main object is estimated from among the objects being displayed around the main object. Accordingly, the next main object is estimated by targeting on the objects being displayed which are located around the center of the screen of the touch UI 1904, and the display range of the page can be moved. On the contrary, regarding an object displayed near an outer edge of the touch UI 1904, it is possible in some cases that the display range cannot be moved to an object that a user wants. Thus, according to a third exemplary embodiment, a dead area of the main object estimation processing is provided to near the center of the screen of the touch UI 1904 in the page movement processing, and the main object estimation processing is performed only when a touched coordinate moves out of the dead area in the continuous swipe operations.

Figure 34:
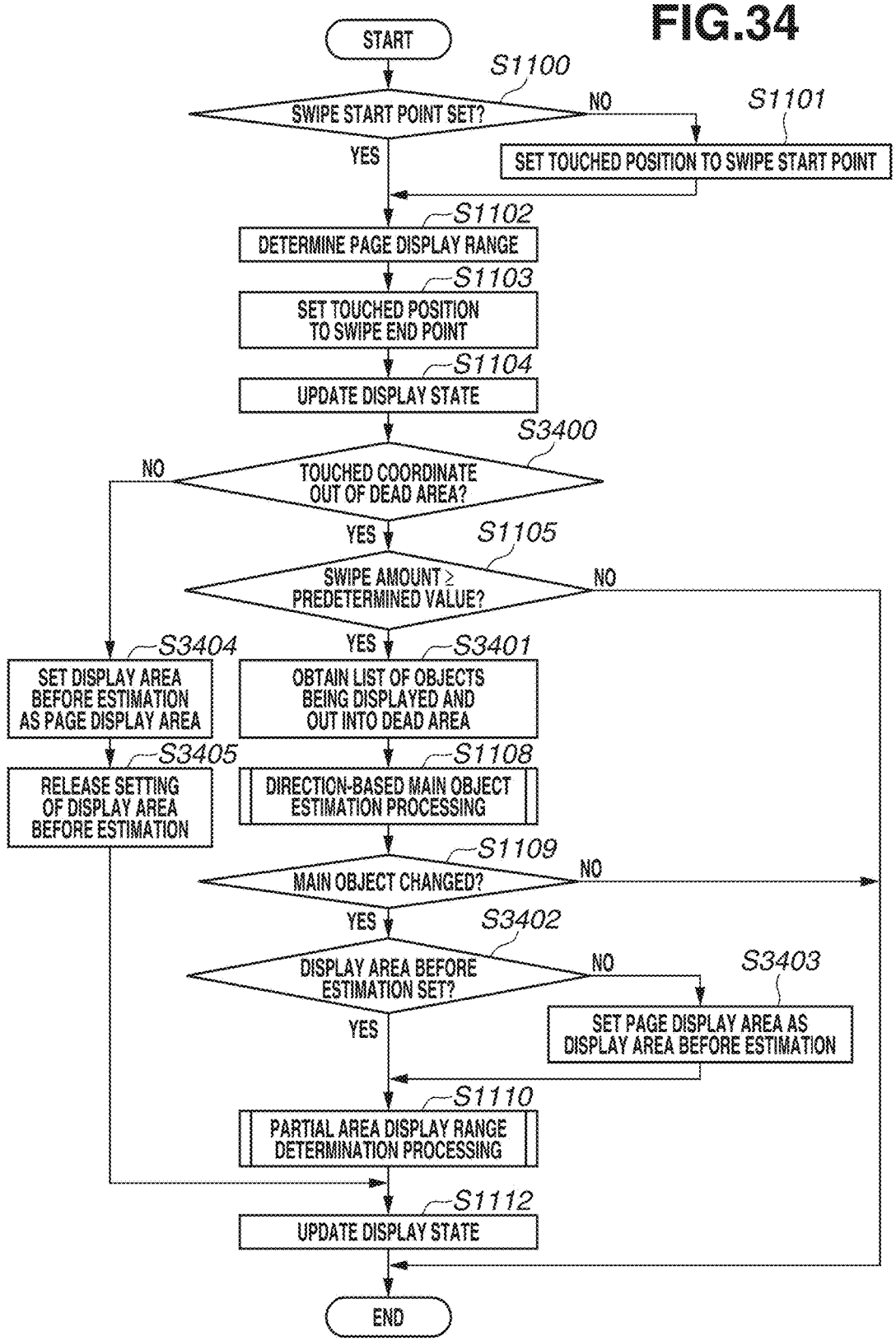
FIG. 34 is a flowchart illustrating page movement processing described according to a third exemplary embodiment.

The page movement processing performed by the swipe event processing unit 2401 according to the third exemplary embodiment is described with reference to FIG. 34 to FIGS. 36A to 36E. FIG. 34 is a flowchart illustrating the page movement processing according to the third exemplary embodiment. The same reference numerals are assigned to steps similar to those in the first exemplary embodiment and descriptions thereof are omitted, and steps different from the first exemplary embodiment are only described below. FIGS. 36A to 36E are examples of a screen display on the touch UI 1904 of the mobile information terminal 107 according to the present exemplary embodiment.

First, in step S1101, the swipe event processing unit 2401 sets the swipe start point when the swipe start point is not set, determines the display range of the page 2300 from the touched coordinate of the received swipe event and a moving distance, and updates the display on the touch UI 1904.

Figure 36A:
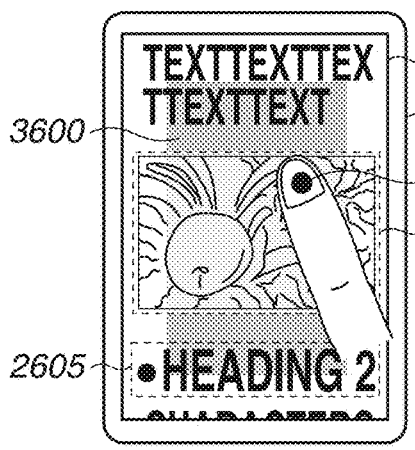
FIGS. 36A, 36B, 36C, 36D, and 36E are examples of screen display of a touch UI on a mobile information terminal.

Next, in step S3400, the swipe event processing unit 2401 determines whether the latest touched coordinate of the received swipe event is out of the dead area of the touch UI 1904. In this regard, a dead area is an area in which, if a touched coordinate of the swipe event is in the dead area, below-described direction-based main object estimation processing is not performed and only movement of the display range of the page is performed by following the swipe operation. FIG. 36A indicates a state immediately before a user performs a swipe operation by touching a position of a touched coordinate 3601 with a finger in a state in which the object 2601 is displayed as the main object as shown in FIG. 26B. A dead area 3600 is set at a predetermined position on the center of the screen of the touch UI 1904. In FIGS. 36A to 36E, broken lines surrounding objects and the dead area are drawn for facilitating understanding but are not visible.

Figure 36B:
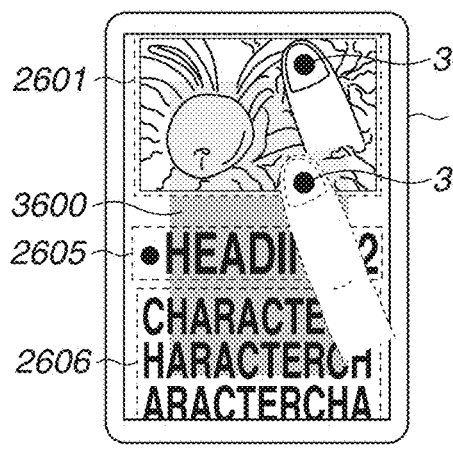

Next, if the swipe amount, which is a distance between the swipe start point and the swipe end point, is equal to or greater than a predetermined value, the swipe event processing unit 2401 advances the processing to step S3401. In step S3401, the swipe event processing unit 2401 obtains a list of objects being displayed which are outside of the dead area and partially out of the display screen. FIG. 36B indicates a state in which the user's finger is moved from a touched coordinate 3601 within the dead area to a touched coordinate 3602 outside of the dead area by the swipe operation of the user from the state in FIG. 36A, and the swipe event processing unit 2401 receives a swipe event. In this state, an object being displayed which is outside of the dead area 3600 and partially displayed on the display screen is the object 2606. Next, in step S1108, the swipe event processing unit 2401 performs the direction-based main object estimation processing according to the present exemplary embodiment. Then, in step S1109, if it is determined that the main object is changed (YES in step S1109), the processing proceeds to step S3402, and whereas if not changed (NO in step S1109), the processing is terminated.

Figure 36C:
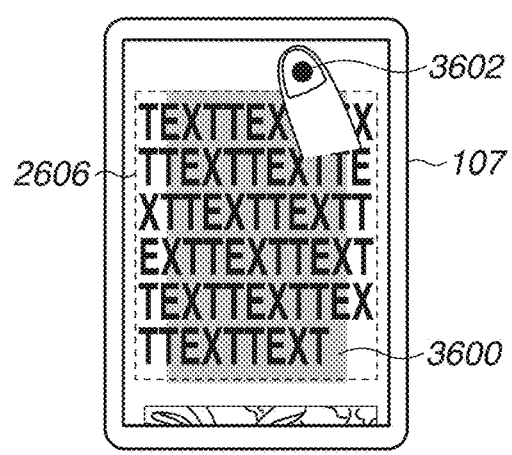

In step S3402, if a display range before estimation is already set (YES in step S3402), the swipe event processing unit 2401 advances the processing to step S1110. Whereas if not set (NO in step S3402), the processing proceeds to step S3403, and the current display range of the page is set as the display range before estimation. More specifically, a display range before estimation is a display range immediately before updating the display range of the page when the main object is changed by the "direction-based main object estimation processing" according to the present exemplary embodiment, and the display range of the page 2300 in FIG. 36B corresponds to the display range before estimation. Next, in step S1110, the swipe event processing unit 2401 performs the partial area display range determination processing and determines the display range of the page 2300 according to the start point, width, height and attribute of the main object. Then, in step S1112, the swipe event processing unit 2401 updates the display state of the touch UI 1904. FIG. 36C indicates a state in which the object 2606 is set as a next main object by executing the "direction-based main object estimation processing" in the state in FIG. 36B, and the display range of the page 2300 is moved by the processing in step S1110 and in step S1112 of the page movement processing. More specifically, when a touched coordinate is outside of the dead area 3600, the "direction-based main object estimation processing" is executed in step S1108, and thus the main object is changed and the display area of the page 2300 is moved. The details are described below however, according to the processing, even in a situation in which a user cannot perform the swipe operation to the outside of the screen any more, the object being displayed which is out of the display range in the moving direction can be viewed in a display magnification and a display range convenient for browsing.

Figure 36D:
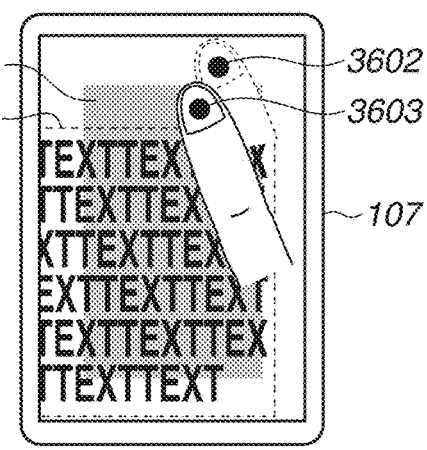
Figure 36E:
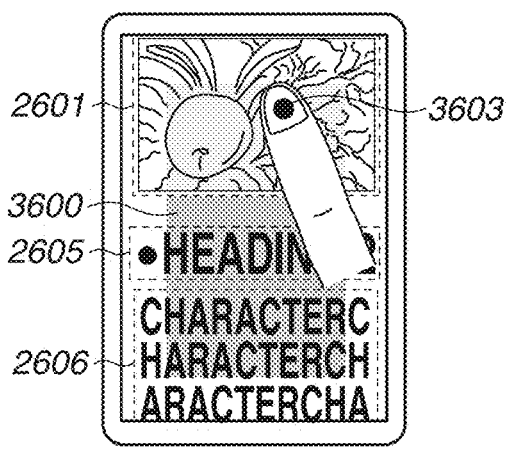

On the other hand, in step S3400, if it is determined that the touched coordinate of the received swipe event is in the dead area (NO in step S3400), then in step S3404, the swipe event processing unit 2401 sets the display range before estimation to the display range of the page 2300. Next, in step S3405, the swipe event processing unit 2401 releases the setting of the display range before estimation set in step S3403 to bring it to an unset state and updates the display state of the touch UI 1904 in step S1112. FIG. 36D is a state in which the user's finger is returned from the touched coordinate 3602 outside of the dead area to a touched coordinate 3603 within the dead area by the swipe operation of the user from the state in FIG. 36C, and the swipe event processing unit 2401 receives a swipe event. FIG. 36E indicates a state in which the display range of the page is changed from the state in FIG. 36D to the display range before estimation, and the display range of the page 2300 is moved in step S1112. In FIG. 36D, the touched coordinate of the swipe event in step S3400 is in the dead area 3600, therefore, the display range before estimation is set to the display range of the page in step S3404. Then, in step S1112, the display state of the touch UI 1904 is updated and the state returns to a state in which the display range of the page is moved by the conventional swipe operation as shown in FIG. 36E. The setting of the display range before estimation is also released when the swipe event processing unit 2401 receives a touch release event.

Figure 35:
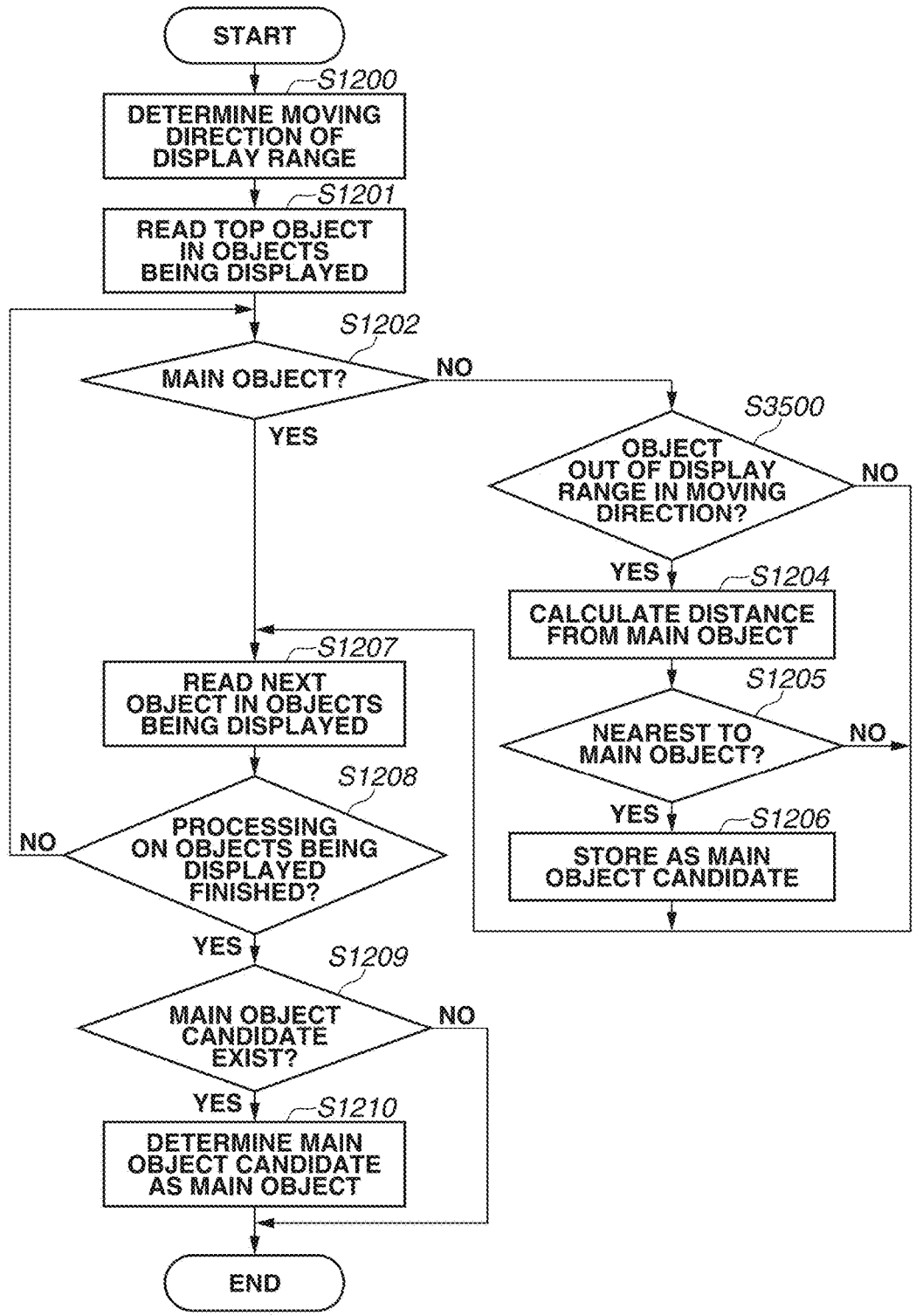
FIG. 35 is a flowchart illustrating main object estimation processing described according to the third exemplary embodiment.

FIG. 35 is a flowchart illustrating "direction-based main object estimation processing (S1108 in FIG. 34)" performed by the swipe event processing unit 2401 according to the third exemplary embodiment in detail. When comparing FIG. 35 and FIG. 12 according to the first exemplary embodiment, the processing is similar to each other except that only step S1203 is replaced with step S3500.

In step S3500, the swipe event processing unit 2401 determines that the object being displayed, which is the read description target, is out of the display range with respect to the moving direction. If the object being displayed is out of the display range (YES in step S3500), the processing proceeds to step S1204, and whereas if not (NO in step S3500), the processing proceeds to step S1207. The display range moving direction can be eight directions including upward, downward, right, and left directions and four oblique directions, as described in the first exemplary embodiment. Thus, if the object being displayed is displayed by being out of the touch UI 1904 in any of the above-mentioned directions, the processing proceeds to step S1204. In FIG. 36B, the touched coordinate 3601 is the swipe start point, the touched coordinate 3602 is the swipe end point, the display range moving direction is determined as the downward direction in step S1200, and the object 2606 is out of the touch UI 1904 in the downward direction.

According to the third exemplary embodiment, it is described that the processing for estimating a next main object is performed every time the swipe event processing unit 2401 receives a swipe event as described in the first exemplary embodiment, however the configuration is not limited to this. For example, the processing for estimating a next main object may be performed after the event timer described in the second exemplary embodiment detects that a finger remains still for a certain length of time.

As described above, according to the third exemplary embodiment, a dead area is provided and the display range of the page is moved by a conventional swipe operation in the dead area, and if swipe operations are continuously performed to the outside of the dead area, the display is moved to the object out of the screen in the display range moving direction. Accordingly, regarding an object which is out of the screen and a plurality of swipe operations is required to browse the object since a user cannot move his/her finger to the outside of the screen any more by the conventional swipe operation, the object can be displayed on the screen in an appropriate display range for a user to browse by a single swipe operation. Further, if the user leaves the finger from the touch UI 1904 in that state, the display range of the page can be maintained, and if the user returns the finger to the dead area without leaving the finger from the touch UI 1904, the display range can be intuitively returned to a state before the display range is moved by the estimation of the main object.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiments of the present disclosure, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-251394, filed Dec. 4, 2013 which is hereby incorporated by reference herein in its entirety.

What is claimed is:

1. A display apparatus for displaying an image containing a plurality of objects, the display apparatus comprising:
   a setting unit configured to set one of the plurality of objects as a first object and set a first magnification of the first object according to a size of the first object;
   a display control unit configured to perform control in such a manner that, based on the first magnification set by the setting unit, zooming in to at least a part of the image is performed and the first object is displayed on a screen;
   a receiving unit configured to receive a swipe operation by a user on the screen; and
   an estimation unit configured to, as a result of a change in a region of the image to be displayed on the screen due to the swipe operation, in a case where the first object is included in objects to be displayed on the screen, estimate an object at a position nearest to the first object, among the objects to be displayed on the screen, as a second object to be displayed next to the first object, and in a case where the first object is not included in the objects to be displayed on the screen, estimate an object displayed at a center of the screen, among the objects to be displayed on the screen, as the second object to be displayed next to the first object, wherein the display control unit performs control in such a manner that, based on a magnification set based on a size of the object estimated as the second object, zooming in to at least a part of the image is performed and the second object is displayed on the screen.

2. The display apparatus according to claim 1, wherein, in a case where the first object is not included in objects to be displayed when the swipe operation is performed, the estimation unit estimates the second object based on display positions and display areas of the other objects to be displayed when the swipe operation is performed.

3. The display apparatus according to claim 1, wherein, in a case where a user further performs a next swipe operation with his/her finger touching the screen after the display control unit displays the second object estimated by the estimation unit on the screen, processing by the estimation unit and the display control unit is executed based on the next swipe operation.

4. The display apparatus according to claim 1, wherein, in a case where a swipe operation having a swipe amount equal to or greater than the predetermined amount is performed and a user's finger after the swipe operation is stopped for a predetermined time length or more, the estimation unit estimates the second object to be displayed when the swipe operation is performed based on the swipe operation.

5. The display apparatus according to claim 4, wherein, in a case where the swipe operations are continuously performed, the predetermined time length in a next swipe operation is set shorter than the predetermined time length in a first swipe operation.

6. A non-transitory storage medium in which a program is stored for causing a computer to function as an apparatus for displaying an image containing a plurality of objects, the apparatus comprising:
    a setting unit configured to set one of the plurality of objects as a first object and set a first magnification of the first object according to a size of the first object;
    a display control unit configured to perform control in such a manner that, based on the first magnification set by the setting unit, zooming in to at least a part of the image is performed and the first object is displayed on a screen;
    a receiving unit configured to receive a swipe operation by a user on the screen; and
    an estimation unit configured to, as a result of a change in a region of the image to be displayed on the screen due to the swipe operation, in a case where the first object is included in objects to be displayed on the screen, estimate an object at a position nearest to the first object, among the objects to be displayed on the screen, as a second object to be displayed next to the first object, and in a case where the first object is not included in the objects to be displayed on the screen, estimate an object displayed at a center of the screen, among the objects to be displayed on the screen, as the second object to be displayed next to the first object,
    wherein the display control unit performs control in such a manner that, based on a magnification set based on a size of the object estimated as the second object, zooming in to at least a part of the image is performed and the second object is displayed on the screen.

7. A display method for an apparatus for displaying an image containing a plurality of objects, the display method comprising:
    setting one of the plurality of objects as a first object and setting a first magnification of the first object according to a size of the first object;
    performing control in such a manner that, based on the first magnification set by the setting, zooming in to at least a part of the image is performed and the first object is displayed on a screen;
    receiving a swipe operation by a user on the screen; and
    estimating, as a result of a change in a region of the image to be displayed on the screen due to the swipe operation, in a case where the first object is included in objects to be displayed on the screen, an object at a position nearest to the first object, among the objects to be displayed on the screen, as a second object to be displayed next to the first object, and in a case where the first object is not included in the objects to be displayed on the screen, estimating an object displayed at a center of the screen, among the objects to be displayed on the screen, as the second object to be displayed next to the first object,
    wherein control is performed in such a manner that, based on a magnification set based on a size of the object estimated as the second object, zooming in to at least a part of the image is performed and the second object is displayed on the screen.

* * * * *